United States Patent
Eidelberg et al.

(10) Patent No.: US 10,654,174 B2
(45) Date of Patent: May 19, 2020

(54) UNIVERSAL END OF ARM ROBOT TOOL

(71) Applicant: Festo AG & Co. KG, Esslingen (DE)

(72) Inventors: Boaz Eidelberg, Hauppauge, NY (US); Matthew Quigley, Hauppauge, NY (US); Ralph Weinmuller, Hauppauge, NY (US); Patrick Haran, Hauppauge, NY (US); Mustansir Faizullabhoy, Hauppauge, NY (US); Thomas Pilock, Hauppauge, NY (US); Jack Zhu, Hauppauge, NY (US); Stephen Vidler, Hauppauge, NY (US); Anwar Chitayat, Delray Beach, FL (US)

(73) Assignee: FESTO SE & CO. KG, Esslingen (DE)

( * ) Notice: Subject to any disclaimer, the term of this patent is extended or adjusted under 35 U.S.C. 154(b) by 145 days.

(21) Appl. No.: 15/522,235

(22) PCT Filed: Oct. 28, 2015

(86) PCT No.: PCT/US2015/057787
§ 371 (c)(1),
(2) Date: Apr. 26, 2017

(87) PCT Pub. No.: WO2016/069731
PCT Pub. Date: May 6, 2016

(65) Prior Publication Data
US 2017/0334075 A1    Nov. 23, 2017

Related U.S. Application Data

(60) Provisional application No. 62/069,441, filed on Oct. 28, 2014, provisional application No. 62/139,856, (Continued)

(51) Int. Cl.
*G06F 19/00* (2018.01)
*B25J 15/00* (2006.01)
(Continued)

(52) U.S. Cl.
CPC ........... *B25J 15/0061* (2013.01); *B25J 9/023* (2013.01); *B25J 19/007* (2013.01)

(58) Field of Classification Search
CPC ....... B25J 15/0061; B25J 9/023; B25J 19/007
(Continued)

(56) References Cited

U.S. PATENT DOCUMENTS

| 4,516,476 A | 5/1985 | Beaton |
| 4,543,638 A | 9/1985 | Scarffe |

(Continued)

FOREIGN PATENT DOCUMENTS

| EP | 1524216 A1 | 4/2005 |
| EP | 2660011 | 11/2013 |

(Continued)

*Primary Examiner* — Ronnie M Mancho
(74) *Attorney, Agent, or Firm* — Hoffmann & Baron, LLP

(57) ABSTRACT

An end of arm tool subassembly includes three identical linear drive mechanisms connected directly together to provide three directions of movement. Each linear drive mechanism includes a base defined by a longitudinal axis and a slide movably coupled to the base. The base has at least one mounting surface disposed parallel to the longitudinal axis and an end mounting surface disposed perpendicular to the longitudinal axis. The slide traverses in a direction parallel to the longitudinal axis and has a slide mounting surface thereon. One of the identical linear drive mechanisms is directly attached to the end mounting surface of the base of another linear drive mechanism to provide two of the three directions of movement.

5 Claims, 29 Drawing Sheets

Related U.S. Application Data filed on Mar. 30, 2015, provisional application No. 62/210,019, filed on Aug. 26, 2015.

(51) Int. Cl.
*B25J 9/02* (2006.01)
*B25J 19/00* (2006.01)

(58) Field of Classification Search
USPC ........................................................ 700/245
See application file for complete search history.

(56) References Cited

U.S. PATENT DOCUMENTS

| | | | |
|---|---|---|---|
| 5,737,500 A | 4/1998 | Seraji et al. | |
| 6,246,200 B1 | 6/2001 | Blumenkranz et al. | |
| 6,430,472 B1 | 8/2002 | Boillot et al. | |
| 8,935,001 B2 * | 1/2015 | Wilson | B65G 1/0478 700/213 |
| 8,944,481 B2 * | 2/2015 | Collado Jimenez | B25J 15/0061 294/185 |
| 9,440,363 B2 * | 9/2016 | Okahisa | B25J 18/04 |
| 9,700,976 B2 | 7/2017 | Gao et al. | |
| 9,808,933 B2 * | 11/2017 | Lin | B25J 9/163 |
| 10,315,281 B2 | 6/2019 | Gao et al. | |
| 2009/0193642 A1 | 8/2009 | Lin et al. | |
| 2012/0280527 A1 | 11/2012 | Lin et al. | |

FOREIGN PATENT DOCUMENTS

| | | | |
|---|---|---|---|
| EP | 2660011 A1 * | 11/2013 | .......... B25J 15/0061 |
| WO | WO2011059167 | 5/2011 | |
| WO | WO2012163390 | 12/2012 | |

\* cited by examiner

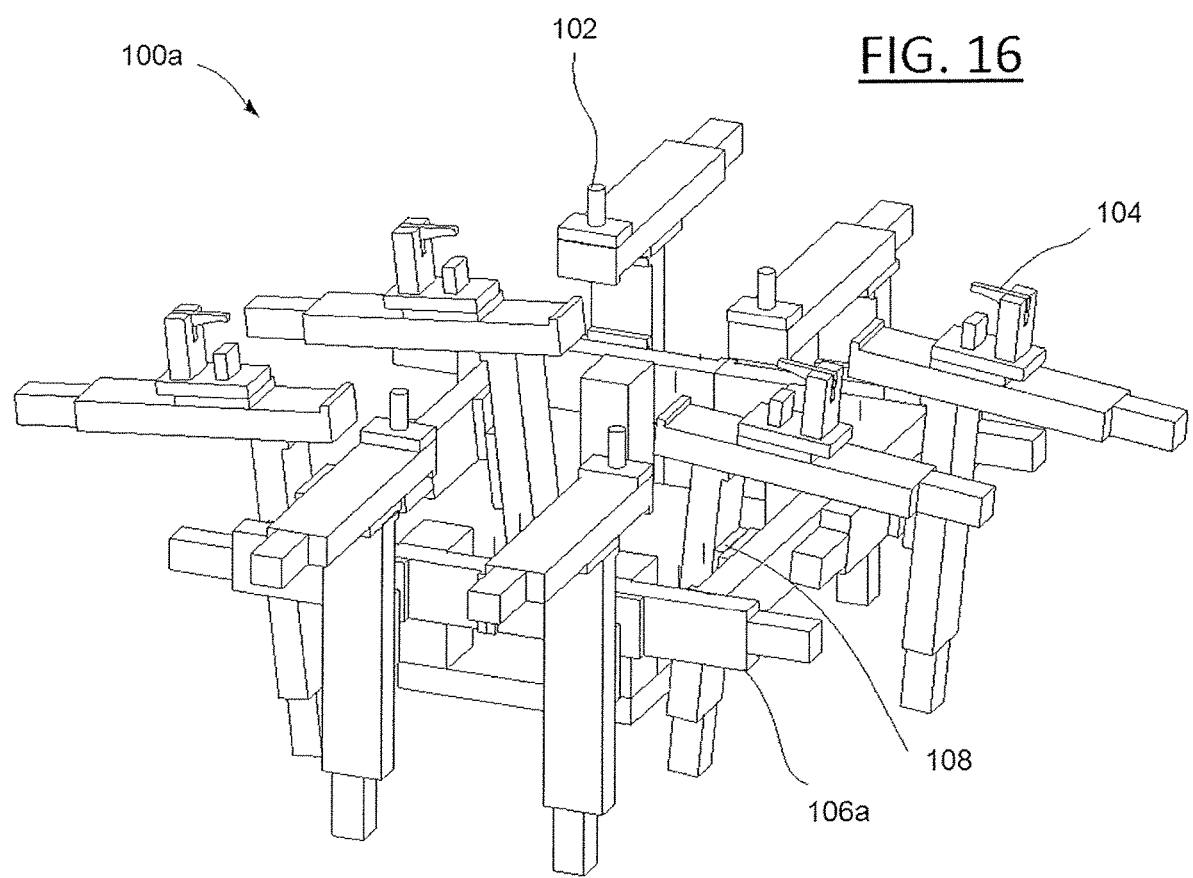

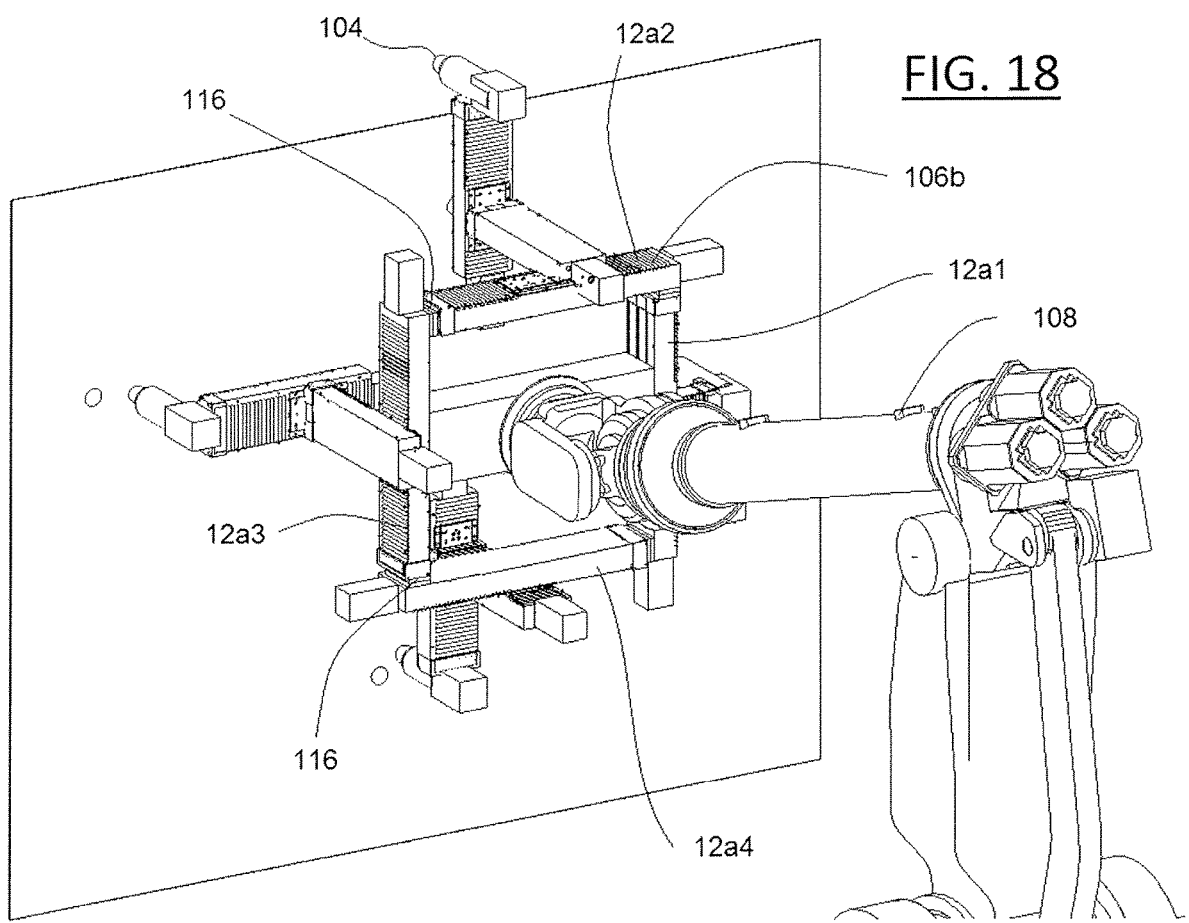

1. Enter XYZ location of tools (pins or clamps) for all body part models

Tool Number

| Body Part Model | | tool 1 | tool 2 | tool 3 | tool 4 |
|---|---|---|---|---|---|
| 1 | X | 350 | 350 | 750 | 750 |
|   | Y | -600 | 600 | 350 | -350 |
|   | Z | 0 | 0 | -20 | -20 |
| 2 | X | 160 | 160 | 1200 | 1200 |
|   | Y | -600 | 600 | 500 | -500 |
|   | Z | 0 | 0 | 10 | 810 |
| 3 | X | 200 | 200 | 1100 | 1100 |
|   | Y | -550 | 550 | 550 | -550 |
|   | Z | 0 | 0 | -8 | -20 |
| 4 | X |  |  |  |  |
|   | Y |  |  |  |  |
|   | Z |  |  |  |  |

2. Select Stages     [SELECT]     [EXAMPLE]     [CLEAR]     [RETURN]

| | tool 1 | | tool 2 | | tool 3 | | tool 4 | | robot |
|---|---|---|---|---|---|---|---|---|---|
| stage | size(mm) | pos(mm) | size(mm) | pos(mm) | size(mm) | pos(mm) | size(mm) | pos(mm) | pos(mm) |

2.1 single robot teach point

| | | tool 1 | | tool 2 | | tool 3 | | tool 4 | | robot |
|---|---|---|---|---|---|---|---|---|---|---|
| stage | X | 190 | 255 | 190 | 255 | 450 | 975 | 450 | 975 | 615 |
| stage | Y | 50 | -575 | 50 | 575 | 200 | 450 | 200 | -450 | 0 |
| stage | Z | 0 | 0 | 0 | 0 | 30 | -5 | 830 | 395 | 98 |

2.2 multiple robot teach points

| | | tool 1 | | tool 2 | | tool 3 | | tool 4 | | part 1 | part 2 | part 3 | part 4 |
|---|---|---|---|---|---|---|---|---|---|---|---|---|---|
| stage | X | 0 | 350 | 0 | 350 | 640 | 1070 | 640 | 1070 | 710 | 900 | 860 | |
| stage | Y | 0 | -600 | 100 | 550 | 150 | 425 | 250 | -475 | -25 | -25 | -75 | |
| stage | Z | 0 | 0 | 0 | 0 | 30 | -5 | 830 | 395 | 98 | 98 | 98 | |

XYZ SYSTEM CONFIGURATOR WITH AN "ALL IN ONE" STAGE

| STAGE | STAGE A | STAGE B | STAGE C | TOOL |
|---|---|---|---|---|
| TRAVEL (100,200,300) | 300 | 300 | 200 | 200 |
| MOUNTING SURFACE (1,2,3,4,5) | 4 | 1 | 3 | |
| SUPPORTING SURFACE (1,2,3,4,5) | 1 | 2 | 1 | |
| XYZ ASSEMBLY | | | | |
| AXIS 1 ALIGNED WITH (X,Y,Z) | Y | X | Z | X |
| AXIS 2 ALIGNED WITH (X,Y,Z) | X | Y | Y | |
| AXIS 3 ALIGNED WITH (X,Y,Z) | Z | Z | X | |
| LOAD | | | | |
| LOAD IN X DIRECTION (N) | | | | 0 |
| LOAD IN Y DIRECTION (N) | | | | 0 |
| LOAD IN Z DIRECTION (N) | | | | 600 |

FIG. 24A

| | EXAMPLE | ANALYZE | CLEAR | RETURN |
|---|---|---|---|---|
| LOCAL DISPLACEMENT | STAGE A | STAGE B | STAGE C | TOOL |
| TOTAL IN DIRECTION 1 (mm) | 0 | 0 | 0.01 | 0 |
| TOTAL IN DIRECTION 2 (mm) | 0 | 0 | 0 | 0 |
| TOTAL IN DIRECTION 3 (mm) | 0.13 | 0.66 | 0.07 | 0 |
| TOTAL 3D DISPLACEMENT (mm) | 0.13 | 0.66 | 0.07 | 0 | recommended STAGE displacement < 0.5 mm STATIC and <0.25 mm DYNAMIC

| GLOBAL DISPLACEMENT | | | | |
|---|---|---|---|---|
| TOTAL IN DIRECTION X (mm) | 0 | 0 | 0.07 | 0.07 |
| TOTAL IN DIRECTION Y (mm) | 0 | 0 | 0 | 0 |
| TOTAL IN DIRECTION Z (mm) | 0.13 | 0.78 | 0.79 | 0.79 |
| TOTAL 3D DISPLACEMENT (mm) | 0.13 | 0.78 | 0.79 | 0.79 | recommended TOOL displacement < 1 mm for REPEATABILITY < than 100 um

FIG. 24B

UNIVERSAL END OF ARM ROBOT TOOL

CROSS-REFERENCE TO RELATED APPLICATION

This application claims the benefit of U.S. Provisional Application No. 62/069,441, filed Oct. 28, 2014, and U.S. Provisional Application No. 62/139,856, filed on Mar. 30, 2015, and U.S. Provisional Application No. 62/210,019, filed on Aug. 26, 2015, which are incorporated herein by reference in their entirety for all purposes.

BACKGROUND

Industrial manufacturing faces many challenges in making consumer products faster, better and cheaper. As a result, manufacturers continuously explore the feasibility of assisting manual labor with automated tools. Such devices include, among others, computer controlled handling systems, which may pick and place parts in and out of process machines faster, more accurately and, therefore, increase the production throughput and the quality of the part.

While responding to market needs, manufacturers also need to make provisions for fast product changes on the same production line. While manual labor can easily adapt to such changes, automation tools must be physically reconfigured. Such reconfiguration results in down time, which in turn elongates the payback period of the tool.

In order to reduce down time, as result of tool changes, manufacturers are continuously searching for intelligent tools, which may be reconfigured upon controller command in a very short time and, therefore, quickly handle a need for a product change. Such a tool is sometimes referred to as an Intelligent End of Arm Tool (iEOAT).

iEOATs are gaining increased popularity among automotive manufacturers. This is because, in a typical automotive assembly line, exterior body parts, such as hoods, roofs, doors and wheels, can change from one car model to another. Such changes can involve changes in shape, color, size, texture. Accordingly, the tools that handle these parts must therefore change with it.

Automotive body parts are usually welded to each other in their manufacturing process. The body parts, which are being joined together are positioned along the assembly line in frames, fixtures or held by a robot while another robot moves in space to weld them. The need therefore is to have an intelligent tool at the end of the robot arm which will adapt to the changes in the body part. The iEOAT addresses this need by adding a higher level of intelligence and manipulation capabilities to capital equipment used in assembly lines.

In simple terms, the iEOAT may simply be a 3D adaptive gripper, which is mounted at the end of a robot arm, which carries locating pins and clamps. In the manufacturing process, the robot moves its arm at high acceleration in six degrees of freedom. The gripper at the end of the arm moves in close proximity with the car body part, and then moves slowly such that the pins locate the part. The gripper then closes its fingers around the body part and moves it quickly, once again, at high acceleration to the assembly point. The intelligent reconfigurable 3D gripper has the capability of adapting the location of its "pointing fingers" (pins) and "pinching fingers" (clamps) to the size and shape of the body part. However, since the shape of automotive body parts are three dimensional, the iEOAT must have the capability to adapt its finger's positions in three dimensions.

By using an iEOAT system in car manufacturing lines, automotive manufacturers may run small batch production on the same assembly line without the penalty of excessive downtime, which otherwise may be needed to change tools from one car model to the other.

However, conventional end of arm robot tools have one or more of the following limitations:

1. They consist of many accessory parts, like mounting brackets and support brackets, placing a burden on stocking many spare parts;
2. They lack standardization such that each tool requires custom design;
3. They are heavy, which limits the number of parts that the robot can carry;
4. They lack stiffness, which may damage motion components, reduce repeatability;
5. They are large, which limits the number of components which may mount on the robot;
6. They have "finger" motion, which is limited to one or two dimensions, which may limit the number of car models the robot may handle with the same tool;
7. Their stages have short travel of each finger which may limit the reach needed to handle a large number of car models;
8. They are custom made through a long engineering process consuming long setup time;
9. They are relatively expensive since their adaptability is to a limited number of car styles and they have to change with each new production line new car styles change.

Accordingly, it would be desirable to provide a universal end of arm robot tool that addresses all of the above drawbacks.

SUMMARY

In one aspect of the present disclosure, an end of arm tool subassembly is provided. The subassembly includes three identical linear drive mechanisms connected directly together to provide three directions of movement. Each linear drive mechanism includes a base defined by a longitudinal axis and a slide movably coupled to the base. The base has at least one mounting surface disposed parallel to the longitudinal axis and an end mounting surface disposed perpendicular to the longitudinal axis. The slide traverses in a direction parallel to the longitudinal axis and has a slide mounting surface thereon. One of the identical linear drive mechanisms is directly attached to the end mounting surface of the base of another linear drive mechanism to provide two of the three directions of movement.

In a preferred embodiment, each linear drive mechanism includes three mounting surfaces arranged along the longitudinal axis on a back of the base such the linear drive mechanism has at least five mounting surfaces. The slide is traversable along a front of the base opposite the back. Each of the mounting surfaces preferably includes a plurality of mounting holes and the base preferably includes at least one recessed pocket formed in a side of the base for permitting access to the mounting holes of at least one of the mounting surfaces.

Each linear drive mechanism preferably includes at least one rail supported by the base, a threaded lead screw rotatably supported by the base, a nut threadably coupled to the lead screw and a motor for rotating the lead screw. The nut traverses along the longitudinal axis as the lead screw rotates and the slide is attached to the nut and is slidably coupled to the rail. The rail and screw may be contained within an interior compartment of the base. In this case, the linear drive mechanism further includes a flexible bellows cover substantially covering the interior compartment for protecting the rail and screw.

In another aspect of the present invention, an end of arm tool for a robot is provided. The tool includes at least two of the subassemblies described above, wherein the base of one of the linear drive mechanisms of one subassembly is directly connected to a base of one of the linear drive mechanisms of another subassembly to form a rigid frame member.

In a preferred embodiment, an end mounting surface of the base of one of the linear drive mechanisms of one subassembly is directly connected to an end mounting surface of the base of one of the linear drive mechanisms of another subassembly to form the rigid frame member. The tool preferably includes four rigid frame members directly connected to each other to form a rigid rectangular frame. In this manner, the frame includes four slides traversing in a first direction and four slides traversing in a second direction perpendicular to the first direction.

In another aspect of the present invention, a method for configuring a plurality of linear drive mechanisms, as described above, to form an end of arm tool for a robot is provided. The method includes determining the global coordinates of a plurality of pick-up locations of a work piece to be manipulated by the tool, determining a required output of the tool based on a desired path of travel of the workpiece, displaying a graphical representation of a configuration of the linear drive mechanisms arranged to perform the required output of the tool and optimizing the configuration by determining the optimum mounting surfaces for directly connecting one linear drive mechanism to another.

In a preferred method, a plurality of graphical representations of optional configurations are displayed, wherein each optional configuration is displayed along with a calculated merit value representing at least one of a cost, weight, stiffness, complexity, configuration time, number of parts, reportability, drivability, programming time, teaching time, design time and implementation time.

Thus, the present invention provides a novel linear positioning stage, which can be used in an iEOAT to position a fixture part such as a pin, clamp, vise, gripper, finger or holding bracket in XYZ position, and having all the desirable characteristics described above.

Since typical body parts have numerous geometrical constraints, the tool of the present invention has been made small. In addition, the tool of the present invention is protected from harsh environments of shock, vibration, temperature changes, and welding residues. Since the robot needs to carry it at high acceleration, the tool has been made light weight. Since the clamping forces may need to be high, the tool of the present invention has been made robust and stiff. Since the tool will typically be subjected to thermal changes, the tool of the present invention has been designed to accommodate thermal deformation without structural distortion. The tool of the present invention is also designed to be accurate, reliable and simple enough to replace in short time. Finally, the tool is modular in nature, thereby eliminating the need for additional mounting brackets and accessories and therefore reducing cost.

Features of the disclosure will become apparent from the following detailed description considered in conjunction with the accompanying drawings. It is to be understood, however, that the drawings are designed as an illustration only and not as a definition of the limits of this disclosure.

BRIEF DESCRIPTION OF THE DRAWINGS

FIG. 7a is an isolated view of one embodiment of a slide to slide connection shown in FIG. 7 with clamps, taken along line 7a-7a.

FIG. 16 is a perspective view of an assembly of linear drive mechanisms according to an alternative embodiment of the present invention to form an end of arm robot tool.

FIG. 18 shows an alternative embodiment of a tool of the present invention attached directly to a robot arm.

FIGS. 22B and 22C are sample computer screen pages of an XYZ configurator for inputting information about the mounting configuration of each XYZ set of stage, in many different configurations, and selecting the one that best meets the stiffness and precision limitation of each stage for use with the method of the present invention.

FIG. 23 is a sample computer screen page showing the optional configurations with merit values generated by the method of the present invention.

FIGS. 24A and 24B are sample computer screen pages showing the output generated by the configurator level of the software program according to the present invention.

DETAILED DESCRIPTION

As used throughout herein, the term "tool" is defined as a device, (such as a pin or a clamp), which is used to handle or process a product such as an automobile body part. The term "iEOAT" is defined as an electromechanical system consisting of frames, XYZ stages, brackets, cables, which carry tools such as clamps and pins and can be reconfigured by intelligent control system to handle and process several products with different size and shape. The term "XYZ subassembly" is defined as a system of interconnected stages and cables which are mounted to the iEOAT and carry a tool such as pin or clamp. The term "stage" is defined as an electromechanical device, which can move under computer control in one specific direction. The term "all in one" is defined as a stage that can connect to another "all in one" stage and be in hundreds of different XYZ configurations without brackets. The term "universal iEOAT" is defined as an iEOAT consisting of several XYZ subassemblies, which can be interconnected to each other without any brackets.

Figure 1:
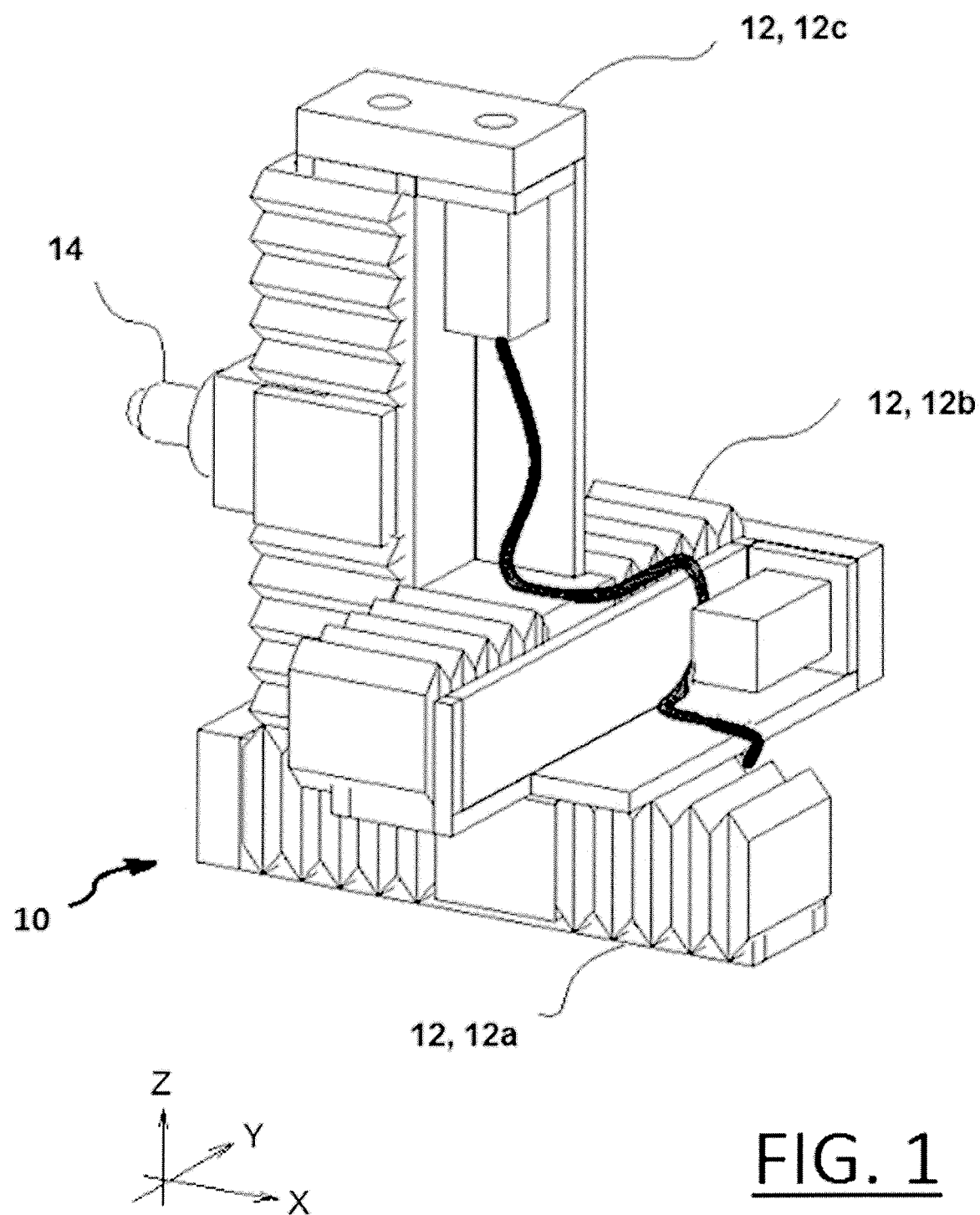
FIG. 1 is a perspective view of one embodiment of a universal end of robot arm tool in accordance with the present invention.
Figure 6:
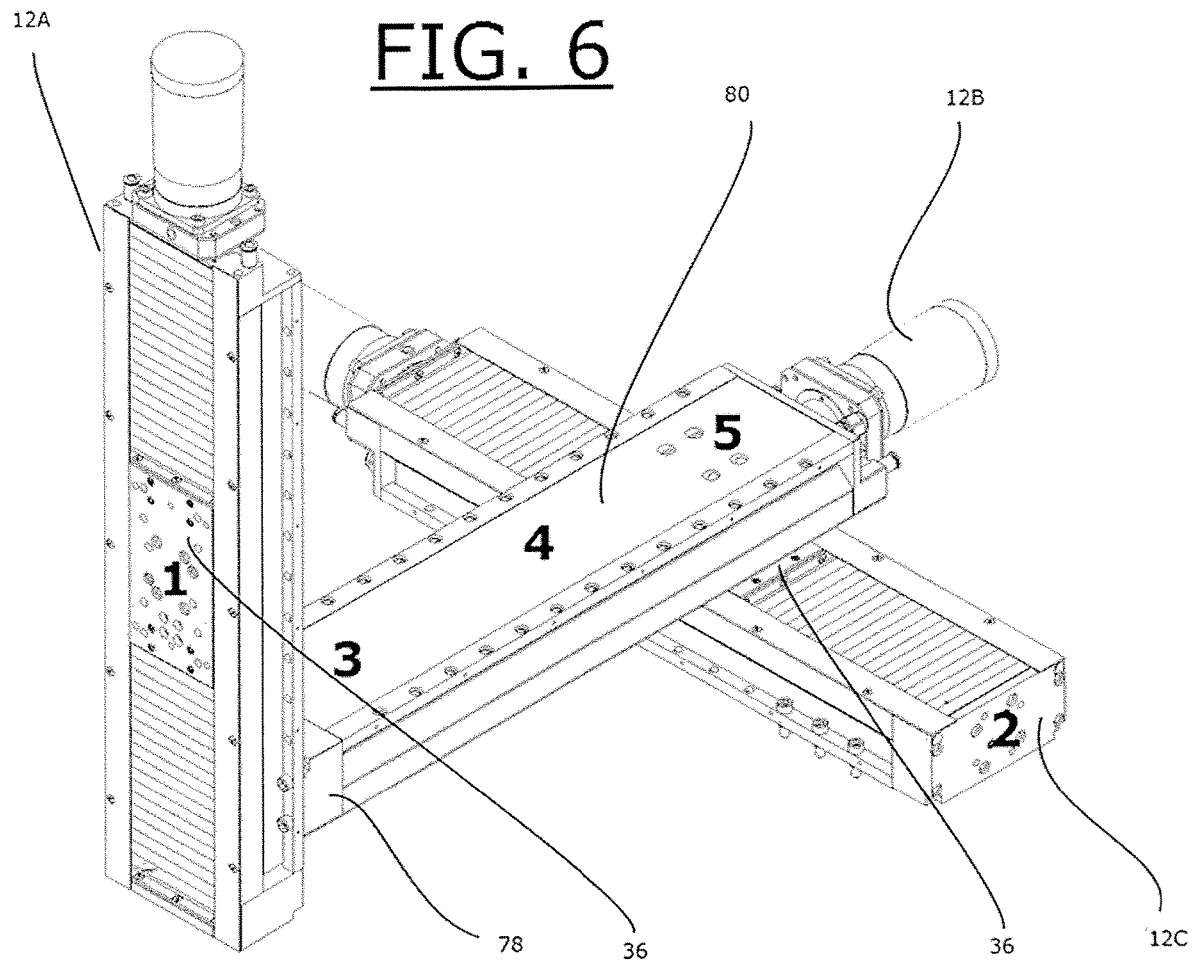
FIG. 6 shows three "all-in-one" linear drive mechanisms connected together according to one embodiment of the present invention.
Figure 14:
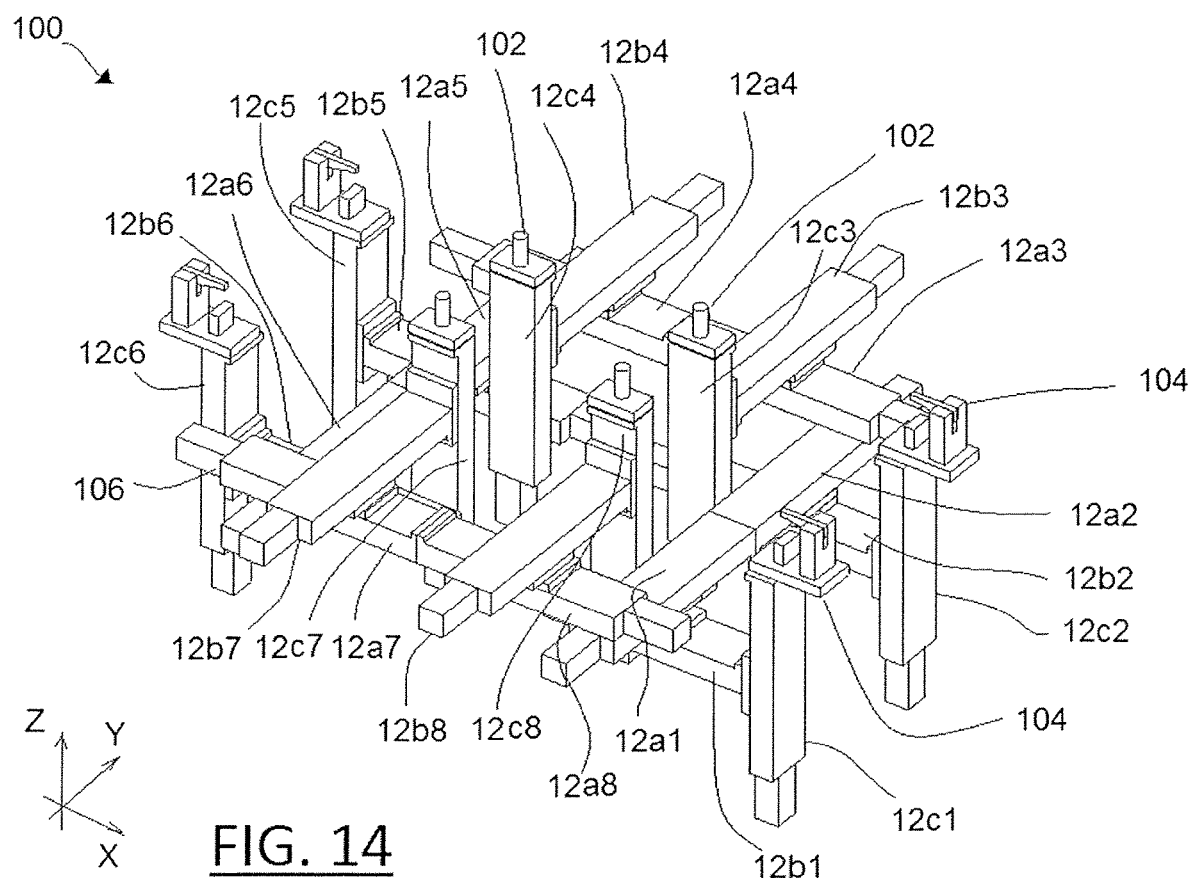
FIG. 14 is a perspective view of an assembly of linear drive mechanisms of the present invention to form an end of arm robot tool.

Referring first to FIG. 1, a universal end of arm robot tool subassembly 10 according to one embodiment of the present invention is shown. The subassembly 10 generally includes three identical linear drive mechanisms 12, (often referred to herein as "stages," or, in the singular, as "a stage"), directly connected to one another in an XYZ configuration. As will be discussed in further detail below, the subassembly 10 can be assembled in a multitude of configurations to form a universal reconfigurable end of arm robot system, as shown in FIG. 14, where each XYZ end of arm subassembly consists of several "all in one" stages, as shown in FIG. 6, which carry an of arm tool such as a clamp or a pin.

Returning to FIG. 1, a first linear drive mechanism 12a, which drives a slide in a first direction (X-axis), is attached to the end of a robot arm (not shown). The first linear drive mechanism 12a is directly attached to a second linear drive mechanism 12b, which drives a slide in a second direction (Y-axis), perpendicular to the first direction. The second drive mechanism 12b is, in turn, directly attached to a third linear drive mechanism 12c, which drives a slide in a third direction (Z-axis), perpendicular to the first and second directions. A workpiece manipulator 14, such as a locating pin or a gripper, is attached to the slide of the third linear drive mechanism 12c.

As a result, the workpiece manipulator 14 is provided with three directions (XYZ) of movement with three identical linear stages. Also, because the stages are connected directly together, there is no need for additional mounting brackets.

Figure 2:
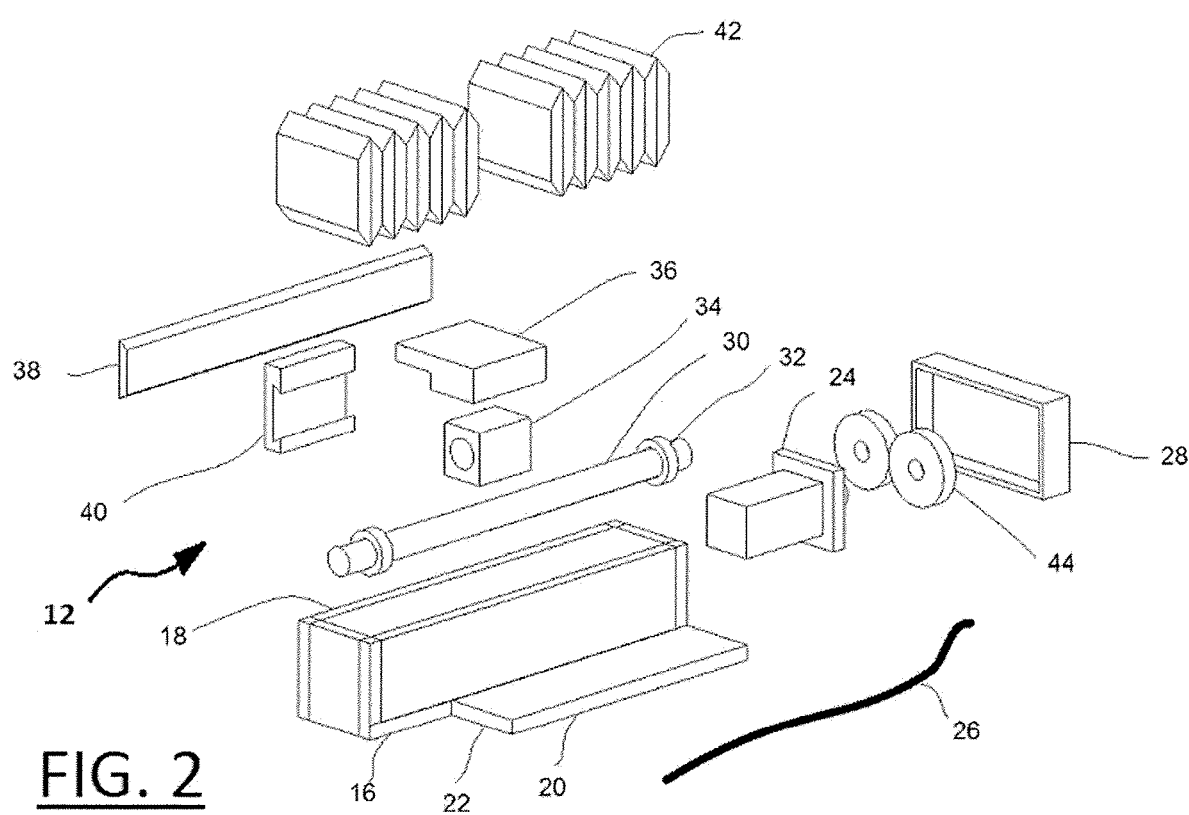
FIG. 2 is an exploded perspective view of one of the linear drive mechanisms shown in FIG. 1.

FIG. 2 is an exploded perspective view of one of the identical linear drive mechanisms 12 shown in FIG. 1. The linear drive mechanism 12 includes a boxed frame 16 designed to provide a stiff and light weight construction to the mechanism and to resist structural deformations. The boxed frame 16 is preferably made of aluminum or other light weight, but strong material. The frame 16 defines a recessed compartment 18 and is formed with an exterior side extension 20 on the bottom of the frame. Extension 20 also serves as an integrated Z bracket, which stiffens the stage when mounted vertically on any mounting surface of the present invention.

The bottom of the boxed frame 16, together with the side extension 20, provide a mounting surface 22 for the end of the robot tool arm, or to another linear drive mechanism. Opposite the mounting surface 22, the side extension provides a mounting surface for a motor 24, a motor cable 26 and a transmission case 28.

The recessed compartment 18 defines a longitudinal space for accommodating a lead screw 30. The lead screw 30 is supported within the compartment 18 at its opposite ends by rotary support bushings 32, which are fixed to the boxed frame 16, but allow for rotation of the lead screw 30 within the compartment. The compartment 18 is designed with a minimal depth so as to mount a nut 34 and a slide 36 in a vertical orientation without interference, and without extending the height more than the required minimum.

The lead screw shaft 30 has built in friction, which eliminates the need for a brake in vertical and horizontal orientation of the stage. It is supported by two rotary bearing on the two ends. Preferably, a bearing 32 on one end is fixed to the boxed frame 16 as a thermal expansion pivot. The bearing on the other end is a bushing, which lets the lead screw shaft expand with respect to the boxed frame without generating a distorting thermo-couple effect. The shaft, therefore, also serves as a structural element in minimizing the size and weight of the stage.

The nut 34 has an internal thread adapted to engage the external thread of the lead screw 30. When threadably attached to the lead screw 30, the nut 34 will traverse in a linear direction along the length of the recessed compartment 18 as the lead screw rotates. The slide 36 is attached to the nut 34 and extends outside of the recessed compartment 18. Thus, as the nut 34 travels within the compartment 18, the slide travels outside the boxed frame 16.

A linear rail 38 is fixed to an exterior surface of the boxed frame 16. The linear rail 38 may be a separate part attached to the boxed frame, or it may be integrally formed in an exterior surface of the frame. An integrally formed rail minimizes hardware, and reduces alignment with banking surfaces and hardware and, therefore, reduces assembly time. An integrally formed rail further adds high stiffness to the frame 16, while reducing the risk of loose hardware due to shock and vibration.

A linear puck 40 is fixed to the slide 36 and is movably coupled to the rail 38. In this regard, the puck 40 may be formed with a groove or slot sized to receive the rail in a sliding manner. The groove may include a retaining lip so as to limit movement of the puck only in the direction of the rail 38. The puck 40 and/or the slide 36 provides a mounting surface for another linear drive mechanism 12, a tool accessory 14 or the end of a robot arm, as desired. In this regard, the slide 36 is preferably square in size to optimize the mounting footprint of the XYZ configurations.

The compartment 18 and the rail 38 are covered by flexible bellows-like covers 42 provided on opposite sides of the slide 36 in the longitudinal direction. The bellows-like construction of the covers 42 allow the covers to move in a telescopic fashion. One side of the covers protects the lead screw 30 from contamination and environmental particles such as welding residues. The other side of the covers protects the linear rail. Both the linear rail 38 and the lead screw 30 require periodic lubrication to assure longevity and high reliability. The cover design is intended to allow quick access to the lubrication points and to internal mounting hardware. This reduces down time and provides simple access to assembly and disassembly of the stages.

As mentioned above, the motor 24 is firmly mounted to the side extension 20 of the frame 16. The side extension is thus provided with clearance holes therethrough to provide easy access to mounting holes in the motor. The motor height and width is restricted to the height of the frame but unrestricted in length. It can therefore incorporate high enough torque and feedback devices such as an encoder or a resolver, and, as may be needed, a gear reducer and a brake. The motor 24 can be any type of motor, such as geared motors, linear motors, belt drives, and linear steppers.

The drive shaft of the motor 24 engages a gear arrangement 44 contained within the transmission case 28. The gears of the gear arrangement 44 are intended to provide parallel motor drive transmission. They may be used at a 1:1 reduction to provide transmission or they may include a gear reduction ratio to increase the motor torque. This option may eliminate the need for an integrated gear inside the motor therefore reducing cost and increasing reliability. The gears require periodic lubrication to assure longevity and high reliability. Lubrication can easily be provided through access holes in the transmission case 28. They are preloaded through motor mounting to minimize backlash. The transmission case encloses the gears and provides support to the motor shaft and the lead screw shafts. It therefore adds to the robust design of the stage.

The cable 26 is integrally connected to the motor 24 for power, and feedback. The cable 26 has connectors on the other end to connect to the user's amplifier, which is mounted in remote. The cable is routed quickly with wide service loops to the cable support surfaces on the other stages. It is also fixed to the external walls of the frames with quick tie wrap fixation.

The embodiment shown in FIGS. 1 and 2 thus provides a tool 10 that requires a common stage with simple integrated parts. The tool 10 serves as a compact robust axis to be quickly integrated into robot or machine bases, or to any other stage in XY, or XYZ configurations and to the end tool of the user. The result is a compact, robust stage, which has minimum number of parts. It has easy access to mounting for repairs and maintenance. It is protected from the environment and gives the freedom of optimizing the motor and encoder size to fit the application requirement of force and velocity.

In order to provide the desired light weight and rigidity the linear drive mechanism 12 can be specially designed in several ways. For example, FIG. 3 shows a cross-section of an alternative embodiment of a linear drive mechanism 12*a* in which two rails 38*a* and 38*b* are provided on perpendicular exterior surfaces 46*a* and 46*b* of a boxed frame in the form of a solid base 16*a*.

Figure 3:
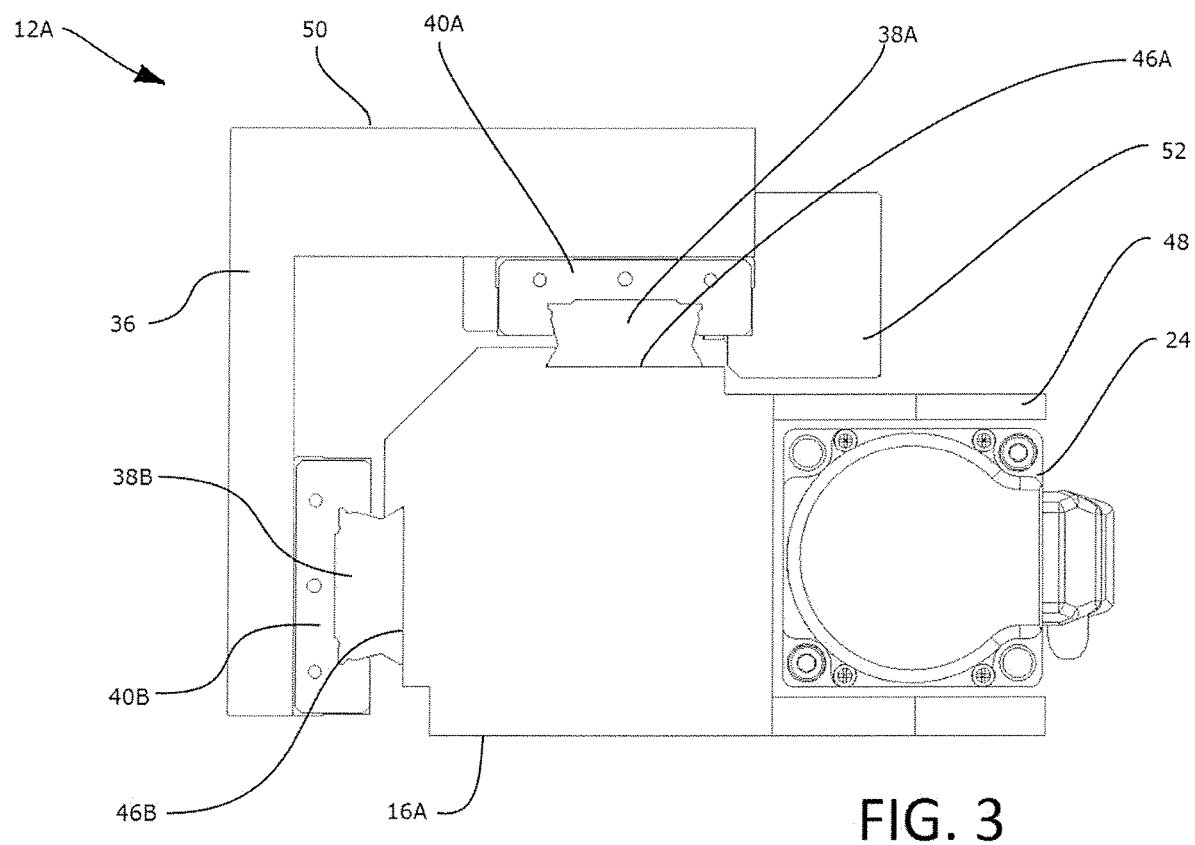
FIG. 3 is a cross-sectional view of an alternative embodiment of a linear drive mechanism formed in accordance with the present invention.

In the embodiment shown in FIG. 3, the base 16*a* is preferably manufactured by extrusion of a light-weight, but rigid material, such as aluminum. The base 16*a* includes an integrated Z-bracket 48, which defines a compartment for housing the motor 24 and the cable.

As mentioned above, one linear rail 38*a* is mounted to one exterior surface 46*a* of the base 16*a*, while another linear rail 38*b* is mounted on a second exterior surface 46*b* of the base, which is perpendicular to the first surface 46*a*. As described above, each rail 38*a*, 38*b* may have one or more moving pucks 40*a*, 40*b*. The pucks 40*a*, 40*b* together are connected to a linear slide 36, which may carry a process moving load 50, or other motion accessories, such as a motion stop clamp 52.

The advantage of the perpendicular rail set 38*a*, 38*b* is to minimize the puck force reactions to external forces and moments in all directions. It should also be noted that the advantage of the two rails on two perpendicular planes is the considerable reduction of moment loading of the pucks 40*a*, 40*b*, and the reduction of reaction forces to external moments due to maximizing the possible distance between the pucks.

To further provide the desired light weight and rigidity to the linear drive mechanism 12, the base itself can be specially designed in several ways. For example, FIG. 4 shows a cross-section of another alternative embodiment of a base 16*b* in the form of an extrusion having integral stiffeners.

Figure 4:
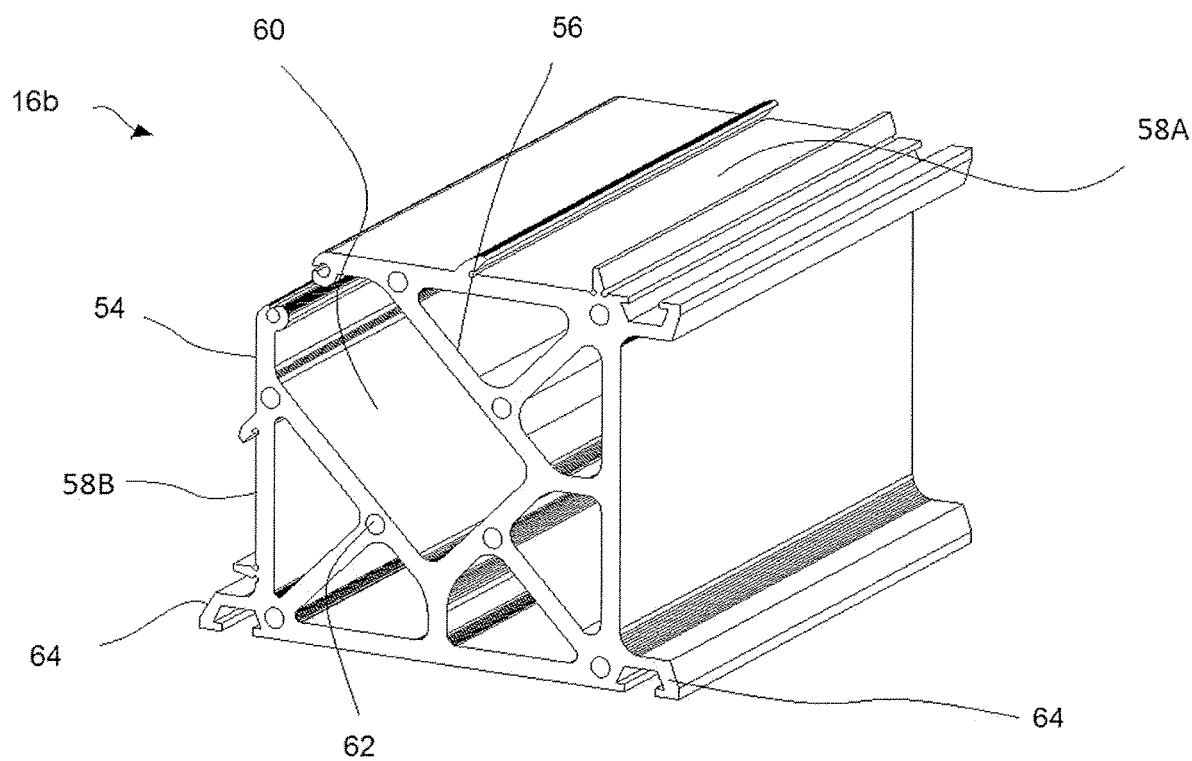
FIG. 4 is a cross-sectional view of another alternative embodiment of a base formed in accordance with the present invention.

The base 16*b* shown in FIG. 4 is an extrusion for a light weight positioning stage, which maximizes the stiffness to bending in normal and transverse directions as well as the stiffness in torsion. This is accomplished by providing integral thin wall stiffening ribs in both normal and inclined directions. Specifically, the base includes external stiffening ribs 54, arranged in a square configuration forming a periphery of the base, as well as internal stiffening ribs 56 arranged in a cross configuration within the external ribs.

The base 16*b* is further preferably formed with perpendicular rail mounting surfaces 58*a*, 58*b*, which are an integral part of the external ribs 54. The internal ribs 56 form an inside compartment 60, which accommodates the actuator mechanism, such as the ballscrew or the linear motor (not shown). Both the external and internal ribs 54, 56 also include threaded mounting holes 62 at end faces thereof for mounting end caps (not shown). At least one of the external ribs 54 is further formed with at least one integral mounting rib 64, which serves as a Z bracket, for mounting the base to a robot arm or to another base.

Figure 5:
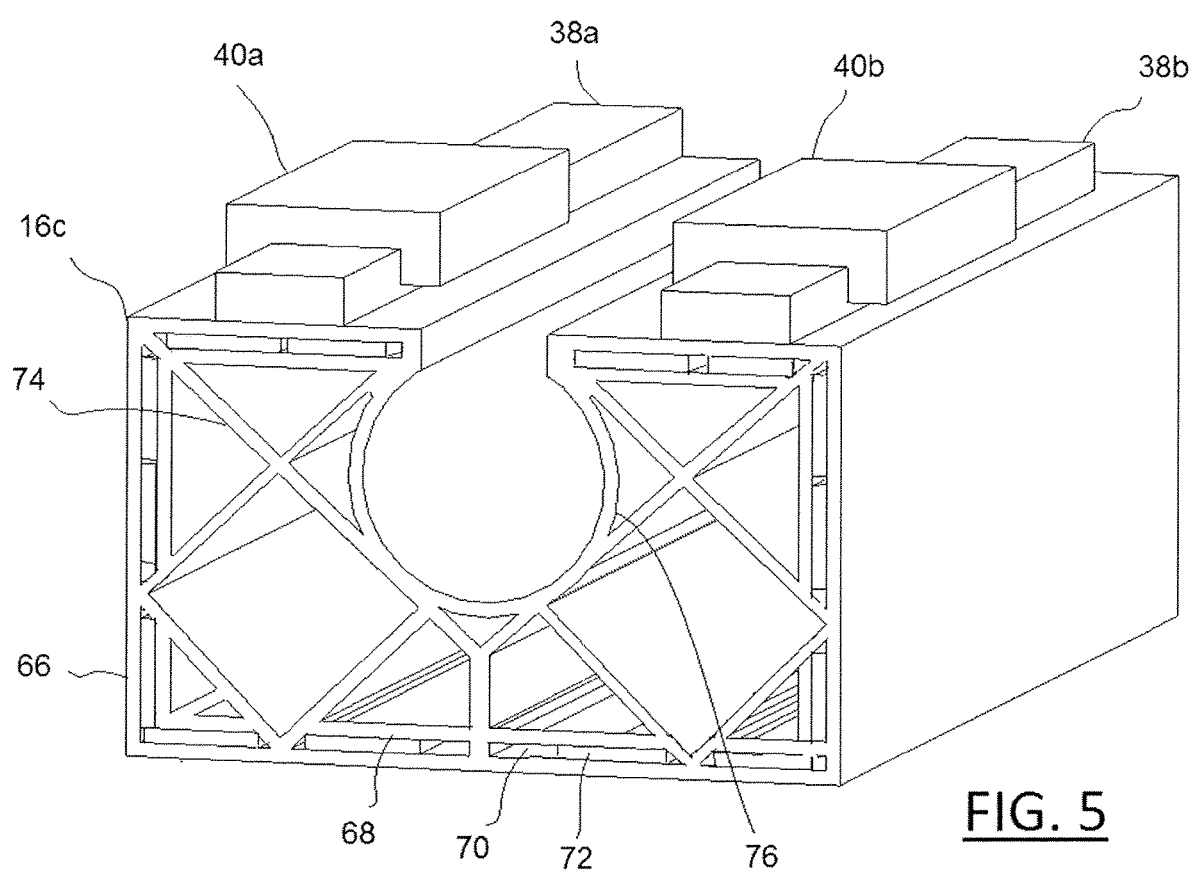
FIG. 5 is a cross-sectional view of still another alternative embodiment of a base formed in accordance with the present invention.

FIG. 5 shows another embodiment of a base 16*c* in the form of an extrusion with crossed aluminum stiffeners and compartments for "sandwiched" stiffeners of composite material (e.g. carbon fiber) on its periphery. In particular, the base 16*c* is an aluminum extrusion having an outer wall 66 forming a rectangular periphery. Two linear rails 38*a*, 38*b* are mounted to an outer face of one of the walls, and each rail has a puck 40*a*, 40*b* coupled to the rail in a sliding manner.

The base 16*c* of this embodiment further includes an inner wall 68 spaced from the outer wall 66 to thereby form a compartment between the inner and outer wall. The inner wall 68 serve as stiffeners for bending and torsion and the compartments 70 receive composite stiffeners 72 to further provide stiffness to the base. The stiffeners 72 may be fastened, for example by glue, pins or bolts, to the enclosed compartment defined between the inner and outer walls 66, 68. Together they form a "sandwich" configuration, which provides enhanced stiffness and rigidity in bending and torsion.

The base 16*c* is further preferably formed with cross stiffeners 74, which provide additional rigidity to bending and twist, and a circular stiffener 76. The circular stiffener 76 forms a compartment communicating with the exterior of the extrusion for accommodating the lead screw, belt or linear motor (not shown).

In all embodiments, the base is uniquely designed to provide maximum modularity benefits to the linear drive mechanism of the present invention. Specifically, as shown in FIG. 6, the base and slide of the linear drive mechanism of the present invention provide five (5) mounting surfaces 1, 2, 3, 4, 5 for mounting to a robot arm or to another linear drive mechanism. The slide 36 of each drive mechanism provides a first mounting surface 1, the longitudinal end 78, opposite the motor, provides a second mounting surface 2 and the back surface 80, opposite the slide 36, provides three separate mounting surfaces 3, 4, 5 spaced along the length of the base. Thus, the linear drive mechanism of the present invention allows for numerous assembly configurations.

For example, FIG. 6 shows three identical linear drive mechanisms 12a, 12b, 12c connected together in one arrangement. A first linear drive mechanism 12a is connected to the end 78 of a second linear drive mechanism 12b via its third mounting surface provided on the back face of its base. The second linear drive mechanism 12b is connected to a third linear drive mechanism 12c via a slide to slide connection. Specifically, the first mounting surface 1 provided on the slide of the second linear drive mechanism 12b is attached to the first mounting surface 1 provided on the slide of the third drive mechanism 12c. Any one of the remaining mounting surfaces can be attached directly to a robot arm. Similarly, a workpiece manipulator, such as a pin or gripper, can be mounted to one of the mounting surfaces for full XYZ travel.

Figure 7:
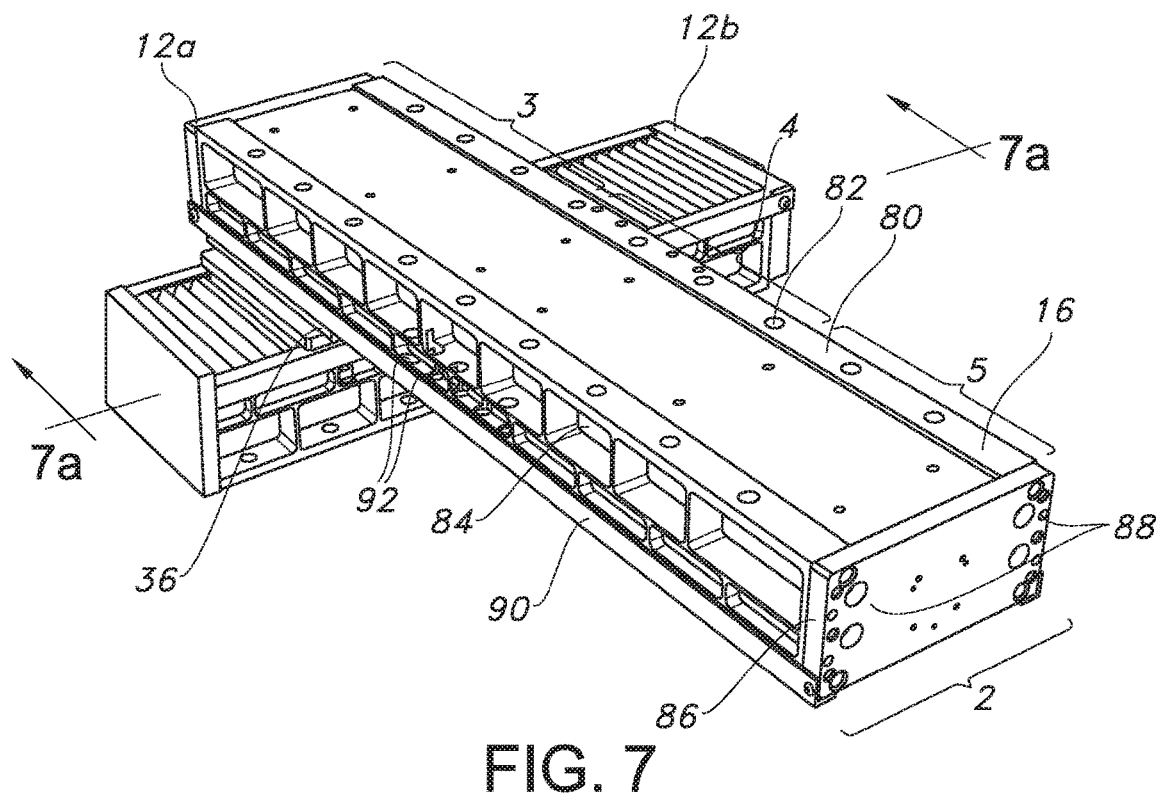
FIG. 7 shows two linear drive mechanisms of the present invention connected together in a slide to slide connection.

FIG. 7 shows in further detail the multiple mounting capabilities of the linear drive mechanism of the present invention. Specifically, FIG. 7 shows a first linear drive mechanism 12a connected to a second linear drive mechanism 12b in a slide-to-slide connection. This can be accomplished by directly fastening the slides together with suitable bolts.

As can be seen in FIG. 7, the back surface 80 of each extruded base 16 has a plurality of mounting holes 82 formed therein. The mounting holes 82 are equally spaced along the length of the base 16 and are provided adjacent both lateral edges of the base at equal distances apart. In this manner, the back surface 80 of the base 16 can be divided into three separate mounting surfaces 3, 4, 5 spread out along the length of the base.

To provide access to these mounting holes 82 from both directions, the sides of each base 16 are formed with access pockets 84 having a depth so as to communicate with the mounting hole and to enable insertion and tightening of a mounting bolt.

The bases 16 shown in FIG. 7 are also provided with an end cap 86 fastened to one longitudinal end thereof. The end cap 86 can be fastened with bolts engaged with threaded holes formed in the end of the base, as described above. The end cap 86 includes additional mounting holes 88 formed therein to provide the second mounting surface 2 for the drive mechanism 12.

Figure 8:
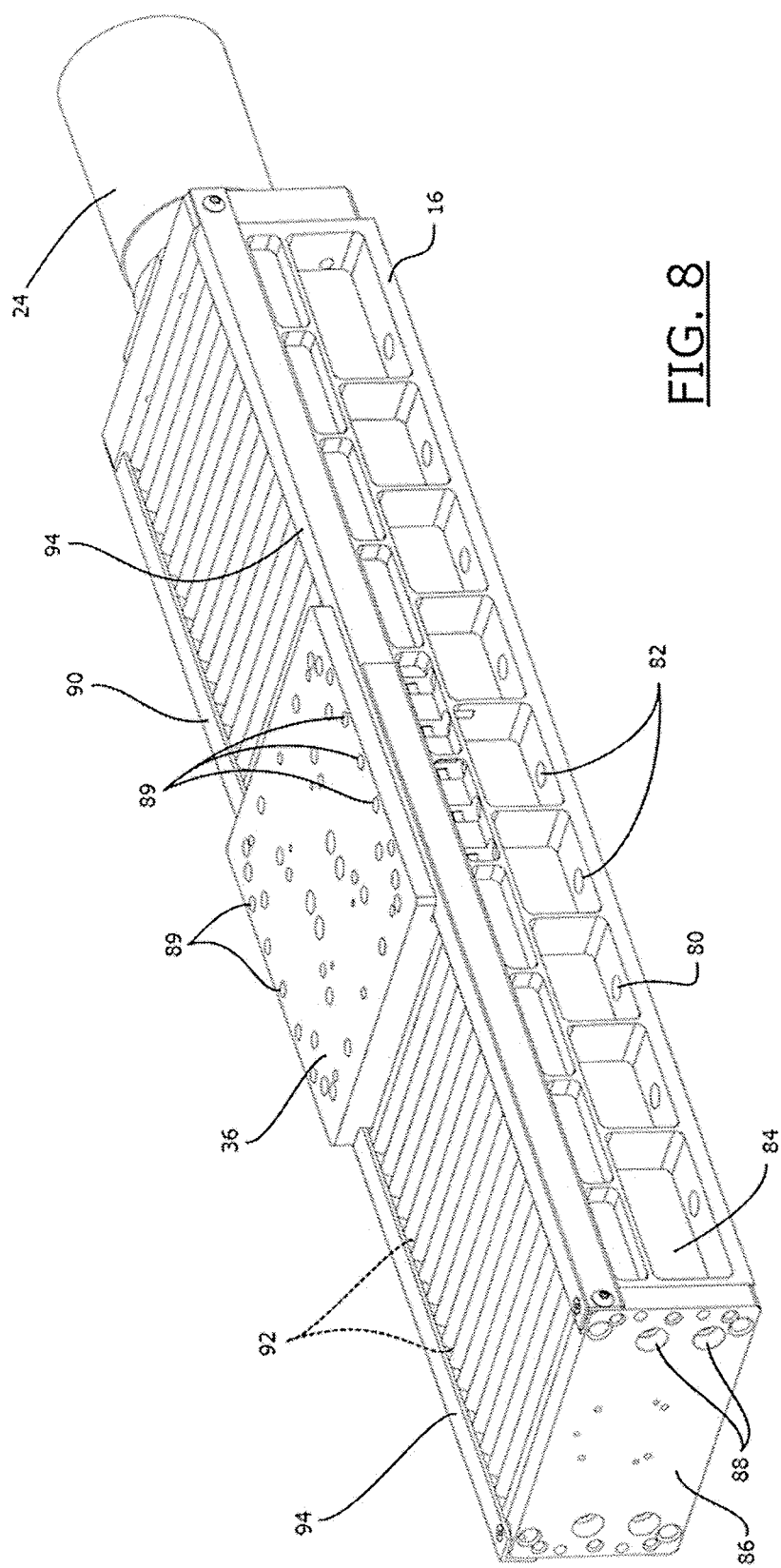
FIG. 8 is a top perspective view of a linear drive mechanism of the present invention.

For example, as shown in FIG. 8, the end cap 86 includes mounting holes 88 that have a spacing in the lateral direction of the base 16 that matches the lateral spacing of the mounting holes 82 on the back surface 80 of the base 16. The spacing in the other direction for all of the mounting holes will also match so as to enable total mounting capability between all mounting surfaces 1, 2, 3, 4, 5 of multiple linear drive mechanisms.

The slide 36 also includes mounting holes 89 for mounting the slide to any of the mounting surfaces of another linear drive mechanism. The mounting holes 89 of the slide will preferably have an arrangement of alternating threaded holes and counter-bored through holes so as to allow a bolted connection without nuts. The lateral spacing between the mounting holes 89 provided on the slide 36 matches the lateral spacing of the end cap mounting holes 88 and the base mounting holes 82. The spacing between adjacent threaded holes of the slide in the other direction will match the longitudinal spacing of all of the other mounting holes. Likewise, the spacing between adjacent counter-bored holes of the slide in the other direction will match the longitudinal spacing of all of the other mounting holes. This will allow for selection of one set of holes in one slide to a cooperating set of mounting holes in the other slide.

As can also be seen in FIG. 8, the access pockets 84 of the base 16 have a depth to also enable access to the mounting holes 88 of the end cap and the mounting holes 89 of the slide. This will allow insertion of a bolt from one direction and a cooperating nut from the other direction for fastening two mounting surfaces together.

The front surface 90 of the base 16, opposite the back surface 80, may also be provided with a plurality of mounting holes 92 similar to the back surface. These mounting holes 92, which are also accessible via the access pockets 84 allow for insertion and tightening of bolts for one method of mounting one slide 36 to another. After assembly, the mounting holes 92 may be covered by edge guards 94, as shown in FIG. 8.

Figure 7A:
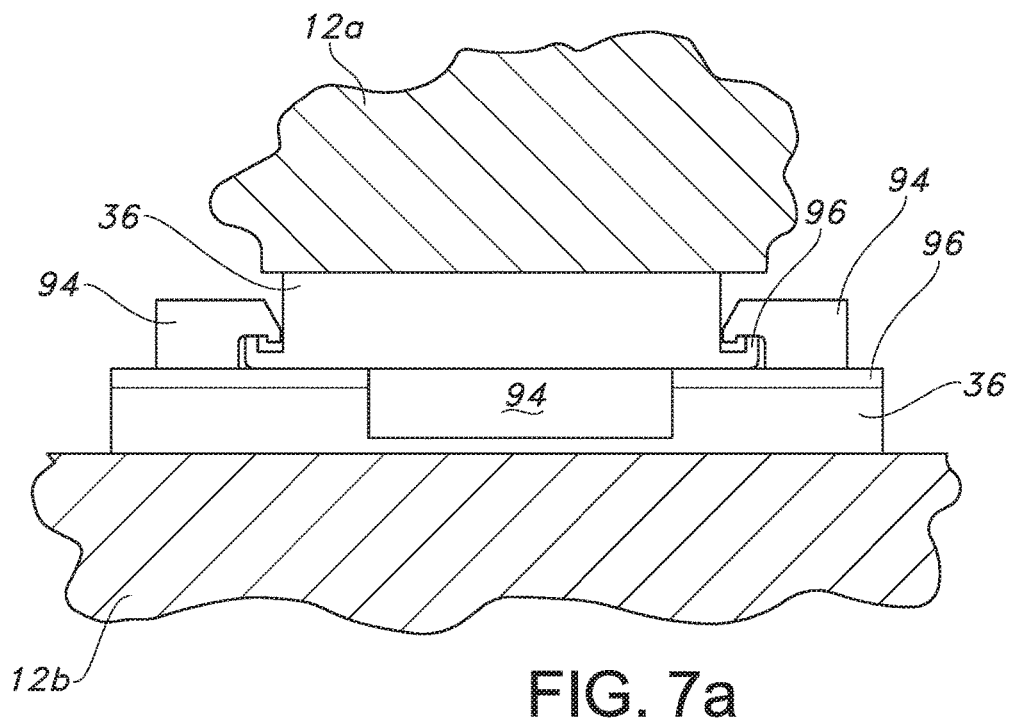

FIG. 7a shows another method for attaching the slide 36 of a first linear drive mechanism 12a to the slide 36 of another linear drive mechanism 12b. In this embodiment, a pair of clamping fingers 94 is mounted to each slide 36 for engagement with the opposite slide. Each slide 36 is also formed with a retaining rib 96 adapted to be captured and retained by the clamping finger 94 of the opposite slide. The clamping fingers are releasably attached to their respective slides by conventional bolts or screws. With the retaining rib 96 of one slide retained by the clamping finger 94 of the other slide, the two slides can be secured together.

Returning to FIG. 8, an alternative embodiment for mounting the motor 24 is shown. In this embodiment, the motor 24 is mounted directly to the end of the base 16 opposite the end cap 86. This provides a more compact linear drive mechanism, which eliminates the need for a side bracket and a transmission case. In this embodiment, the third mounting surface 3, provided on the back face 80 of the base 16, is disposed adjacent the motor 24, the fourth mounting surface 4 is provided midway between the motor and the end cap 86, and the fifth mounting surface 5 is disposed adjacent the end cap, which provides the second mounting surface 2.

Figure 9:
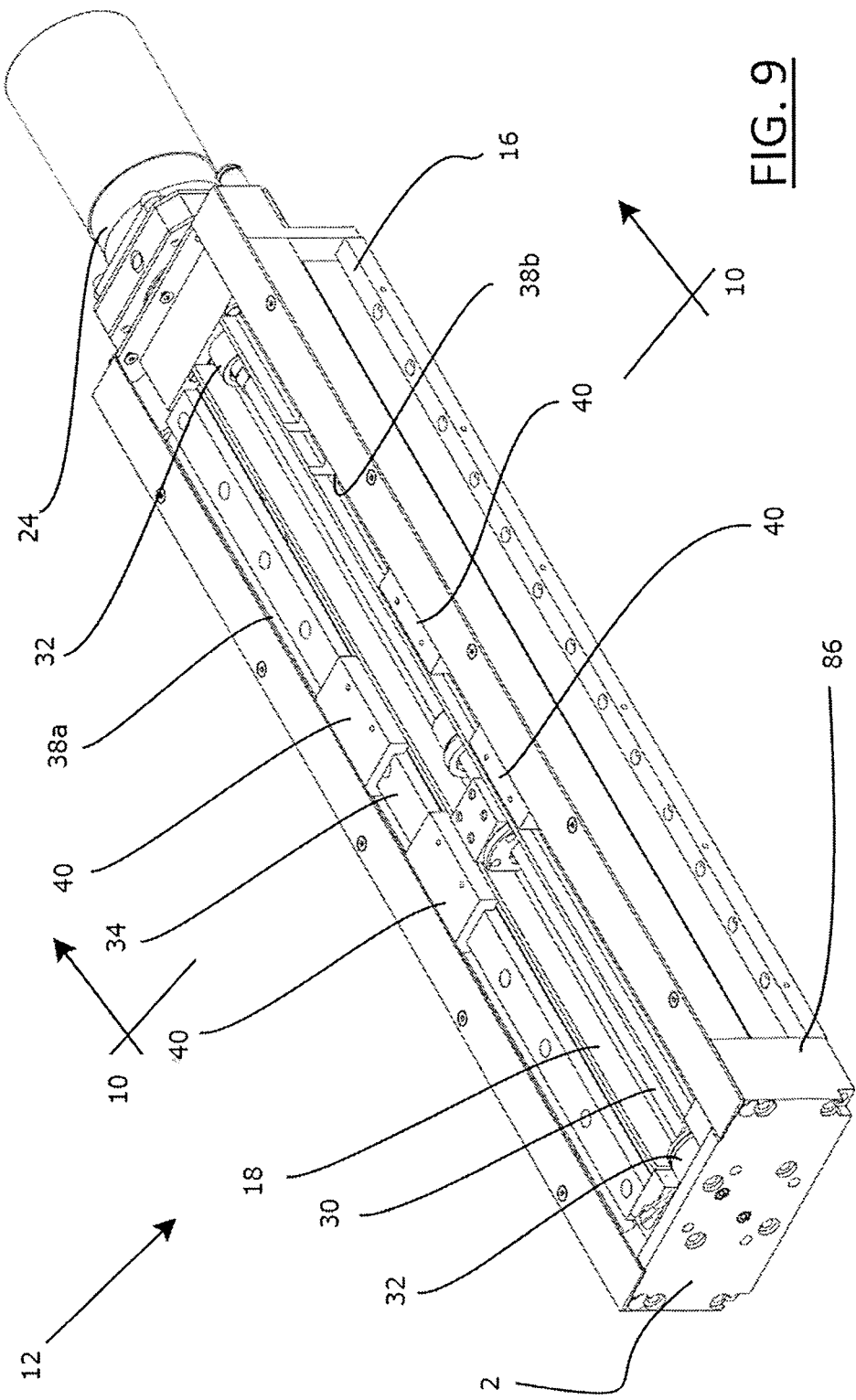
FIG. 9 is top perspective view of the linear drive mechanism shown in FIG. 8 with the slide, covers and edge guards removed.

FIG. 9 shows the linear drive mechanism 12 shown in FIG. 8, with the slide, covers and edge guards removed. In this drawing, it can be seen how the base 16 is formed with a central recessed compartment 18 defining a longitudinal space for accommodating the lead screw 30. The lead screw 30 is supported within the compartment 18 at its opposite ends by rotary support bushings 32, and a brake, which are fixed to the base 16, but allow for rotation of the lead screw 30 within the compartment. The motor 24 is coupled to one end of the lead screw 30 for rotating the lead screw. The compartment 18 also accommodates the nut 34, which is threadably coupled to the lead screw 30 for movement up and down the length of the compartment as the lead screw rotates, as described above.

Two linear rails 38a and 38b are fixed to a front surface of the base 16 and two pucks 40 are slidably coupled to each rail. The slide 36 (not shown in FIG. 9) is, in turn, attached to both the nut 34 and the pucks 40 so that, as the nut is driven up and down the length of the compartment 18, the slide travels along the rails via the pucks. The covers 42 (not shown in FIG. 9) protect both the interior compartment 18 and the rails 38a, 38b.

Figure 10:
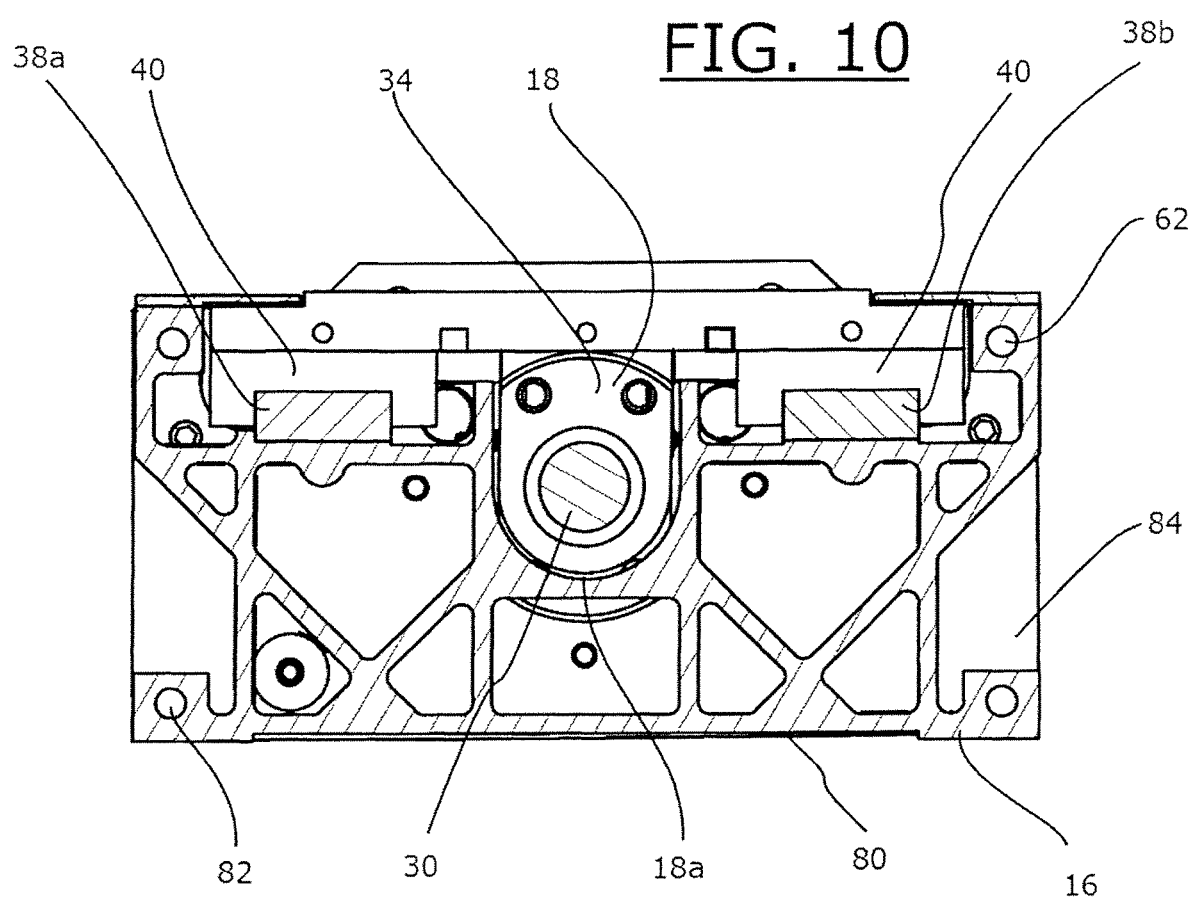
FIG. 10 is a cross-sectional view of the linear drive mechanism shown in FIG. 9 taken along line 10-10.

FIG. 10 is a cross-sectional view of the linear drive mechanism 12 shown in FIG. 9. As can be seen in FIG. 10, the compartment 18 is designed with a minimal depth so as to mount the nut 34 in a vertical orientation without interference, and without extending the height more than the required minimum.

Figure 11:
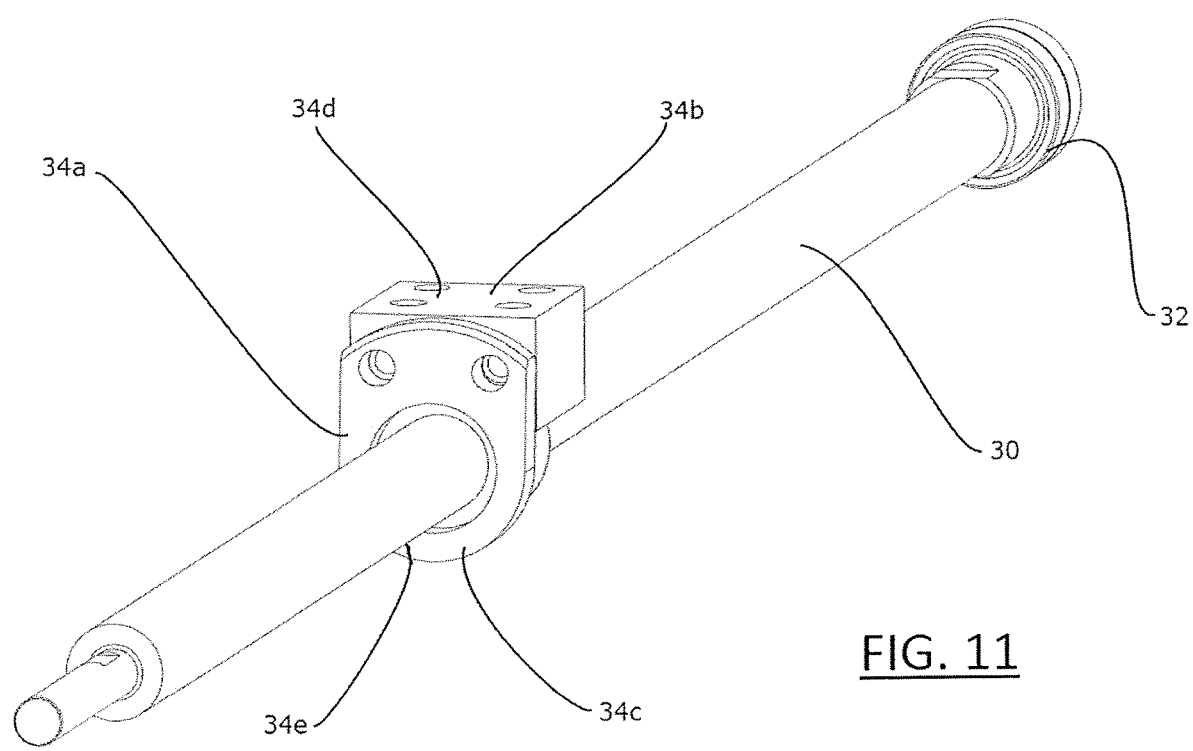
FIG. 11 is an isolated view of the lead screw assembly.

In this regard, a specially designed nut 34 is preferably provided to allow for a minimum depth of the compartment 18. As shown in FIG. 11, the specially designed nut 34 includes an end plate portion 34a and a slide support portion 34b. The end plate portion 34a and the slide support portion 34b may be formed integrally, or they may be separate parts attached together. The end plate portion 34a is formed with a threaded hole 34c to engage the external thread of the lead screw. The slide support portion 34b has an upper surface 34d having threaded mounting holes for mounting the slide. The end plate portion 34a has a curved bottom 34e opposite the upper slide mounting surface 34d. The curved bottom 34e is machined to match the bottom circular curvature 18a of the recessed compartment 18.

Returning to FIG. 10, it can be seen that the base 16 is designed to provide the desired light weight and rigidity to the linear drive mechanism 12. Thus, the base 16 is manufactured by extrusion of a light-weight, but rigid material, such as aluminum, and includes internal integral thin wall stiffeners in both normal and inclined directions. Formed centrally in the base is a circular stiffener forming the curved-bottom compartment 18. External stiffeners form the outer periphery of the base, including the back surface 80 having the mounting holes 82, and further define the access pockets 84 described above. The external stiffeners further include threaded mounting holes 62 at end faces thereof for mounting the end cap at one end and the motor at the opposite end.

Figure 12:
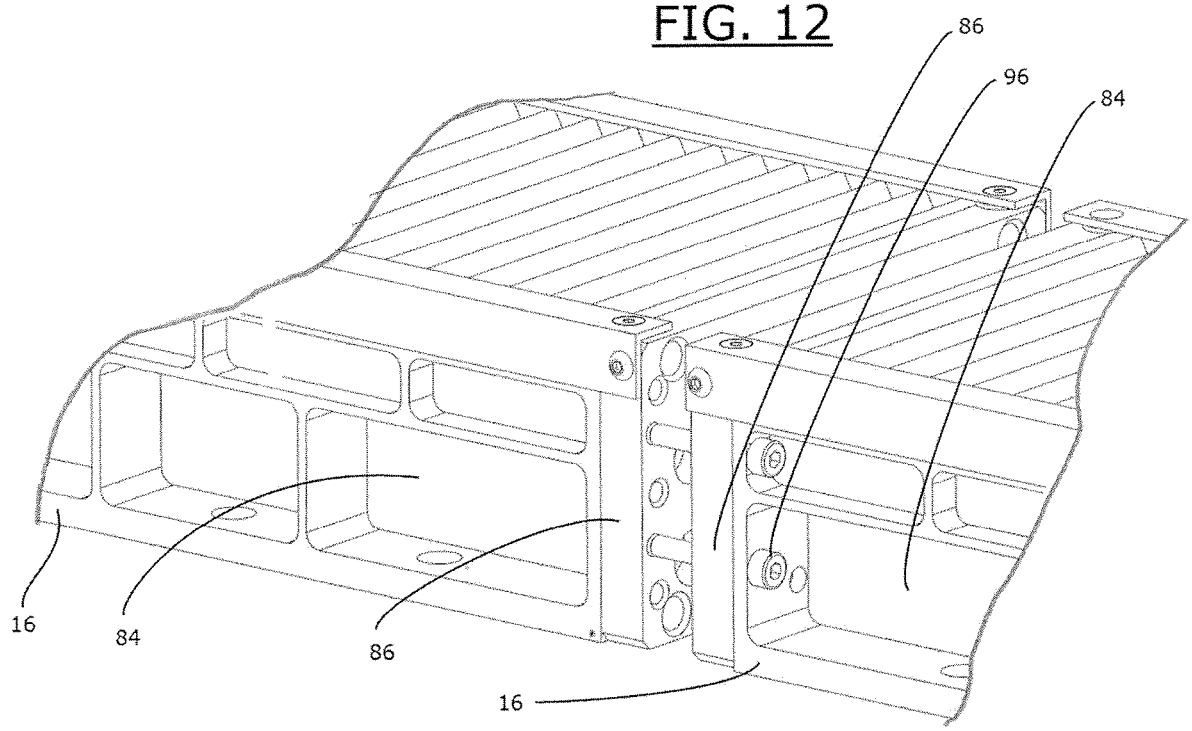
FIG. 12 is an isolated view of the end caps of two linear drive mechanisms of the present invention being connected together in an end-to-end configuration.

By providing multiple mounting surfaces, the universal linear drive mechanisms of the present invention can be configured in many different ways. One of the unique ways the linear drive mechanisms may be configured is by an end-to-end connection. Specifically, FIG. 12 shows how the second mounting surface 2 provided by the end cap 86 can be utilized to mount one linear drive mechanism to another end-to-end. As described above, the base 16 of each linear drive mechanism is provided with a recessed access pocket 84, which allows for insertion of a bolt 96 through a mounting hole 88 of the end cap 86 of one drive mechanism for threaded engagement with a nut (not shown) residing in the access pocket 84 of the base of the other drive mechanism.

Figure 13:
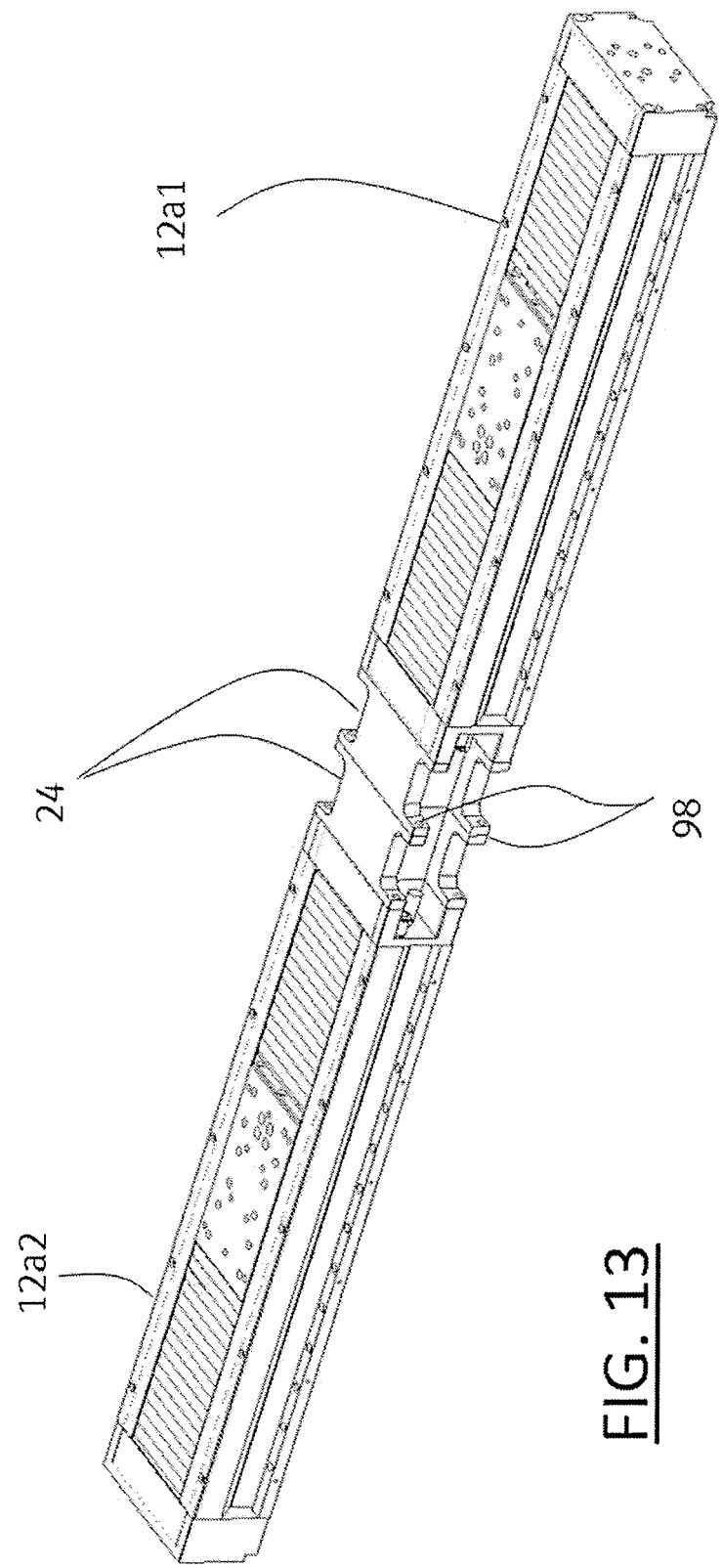
FIG. 13 shows two linear drive mechanisms of the present invention connected together in a motor-to-motor configuration.

In an alternative embodiment, the motor 24 of each drive mechanism can be provided with a flange 98 that allows for motor-to-motor connection between two drive mechanisms 12a1, 12a2, as shown in FIG. 13.

In addition to end-to-end connections, the second mounting surface 2 provided on the end cap 86, as shown in FIG. 12, or on the motor 24, as shown in FIG. 13, further allows for direct perpendicular mounting of linear drive mechanisms without the need for additional angle brackets or mounting hardware between the stages themselves. This permits true orthogonal mounting of linear drive mechanisms for three directions (X-Y-Z directions) of movement for the workpiece manipulator with respect to the robot arm.

Figure 15A:
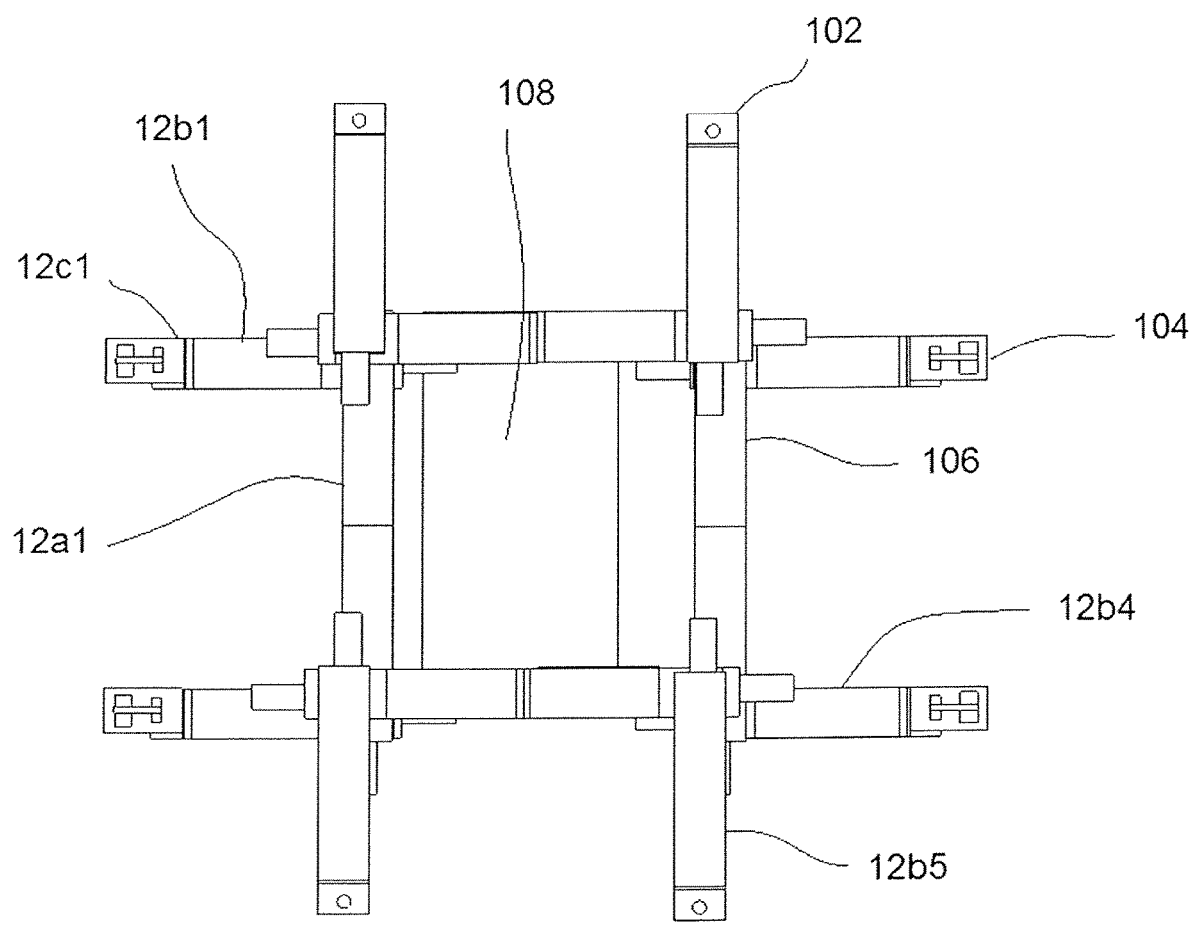
FIG. 15a is a top plan view of the end of arm robot tool shown in FIG. 9 in a fully extended position.
Figure 15B:
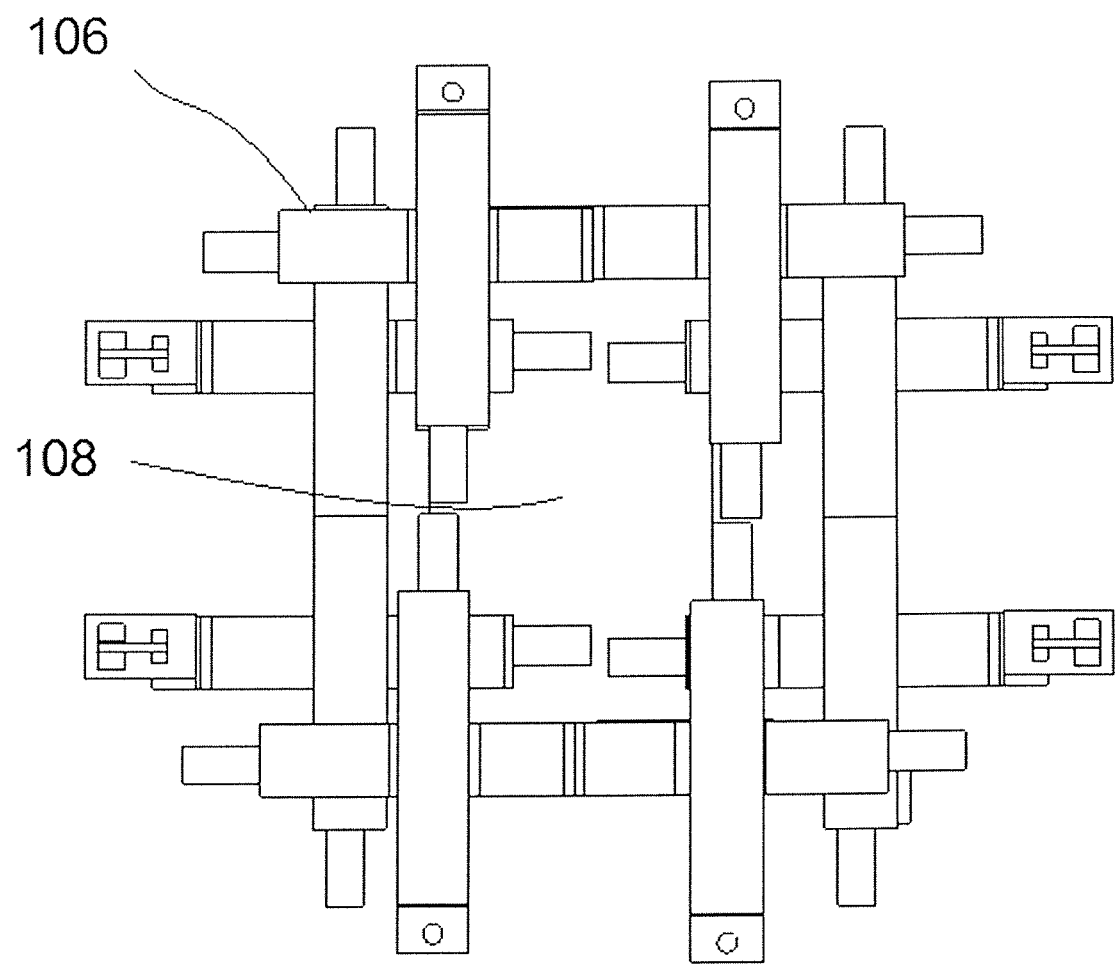
FIG. 15b is a top plan view of the end of arm robot tool shown in FIG. 9 in a fully retracted position.

For example, FIGS. 14, 15a and 15b show a configuration of twenty-four (24) linear drive mechanisms 12 connected in triplets to form an end of arm tool 100 carrying workpiece manipulators in the form of four fingers 102 and four clamps 104. The tool 100 shown in FIGS. 14, 15a and 15b is made by first connecting the bases of eight linear drive mechanisms 12a1, 12a2, 12a3, 12a4, 12a5, 12a6, 12a7 and 12a8 together to form a rigid frame 106. Preferably, two linear drive mechanisms are connected end-to-end via their end caps to form four pairs. The back face of each base of a connected pair is then attached to a back face of a base of another connected pair so that a rigid square frame 106 is formed. The frame 106 thus formed is directly connected to an end of a robot arm 108, as shown in FIGS. 15a and 15b.

As can be seen in the drawings, the slides of two opposite pairs of connected drive mechanisms forming the frame 106 face in one direction and the slides of the other two opposite pairs of the frame face in the other direction. Also, the slides of two opposite pairs of connected drive mechanisms travel back and forth in a first direction (X-direction), while the slides of the other two opposite pairs travel in a direction perpendicular to the first direction (Y-direction).

Attached to each slide of the drive mechanisms 12a1, 12a2, 12a3, 12a4, 12a5, 12a6, 12a7 and 12a8 forming the base frame 106 is a second level drive mechanism 12b1, 12b2, 12b3, 12b4, 12b5, 12b6, 12b7 and 12b8. In a preferred embodiment, the slides of the second level drive mechanisms 12b1, 12b2, 12b3, 12b4, 12b5, 12b6, 12b7 and 12b8 are respectively connected directly to the slides of the frame drive mechanisms 12a1, 12a2, 12a3, 12a4, 12a5, 12a6, 12a7 and 12a8. Each second level drive mechanism 12b1, 12b2, 12b3, 12b4, 12b5, 12b6, 12b7 and 12b8 has a slide that travels in a direction perpendicular to the direction of travel of the slide to which it is attached.

Attached to each end cap of the second level of drive mechanisms 12b1, 12b2, 12b3, 12b4, 12b5, 12b6, 12b7 and 12b8 is a slide of a respective third level drive mechanism 12c1, 12c2, 12c3, 12c4, 12c5, 12c6, 12c7 and 12c8. Accordingly, the third level drive mechanisms 12c1, 12c2, 12c3, 12c4, 12c5, 12c6, 12c7 and 12c8 travel in a third direction (Z-direction) perpendicular to the first direction (X-direction) and second direction (Y-direction).

Attached to the end cap 86 of each third level drive mechanism is one of a finger 102 or a clamp 104. As a result of such assembly, each finger 102 and each clamp 104 is provided with three directions of travel (X, Y and Z directions). This can be seen in FIG. 15a, showing all of the linear drive mechanisms in their fully extended state, and FIG. 15b, showing all of the drive mechanisms in their retracted state.

The linear drive mechanisms of the present invention can be assembled in various ways. For example FIG. 16 shows a configuration of an end of arm robot tool 100a wherein one or more directions of travel of the pins 102 and/or clamps 104 are not perpendicular to each other. This can be achieved by providing inclined mounting surfaces 108 to one or more slides, as desired.

An alternative embodiment for forming the frame 106a is also shown in FIG. 16. In this embodiment, two pairs of end-to-end connected linear drive mechanisms are provided, as described above. However, the linear drives of the other two pairs of linear drive mechanisms are connected together via the back surfaces of their respective bases. Also, the end caps provided at the opposite ends of this pair of linear drive mechanisms is attached to a respective back surface of the end-to-end connected linear drive mechanisms.

Figure 17:
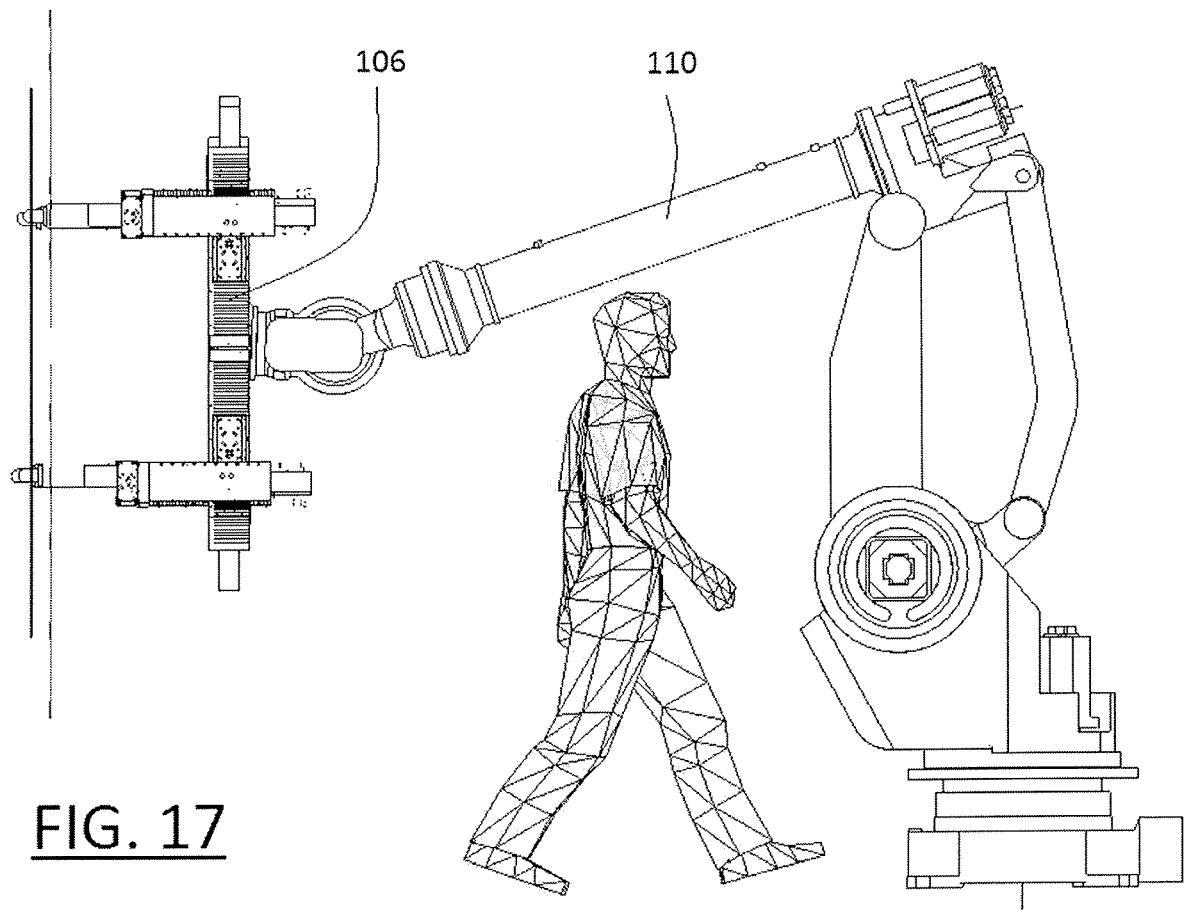
FIG. 17 shows the tool of the present invention attached directly to a robot arm.

Thus, as shown in FIG. 17, the present invention provides a system constructed entirely as a frame structure 106 made of only one type of a small "all-in-one" positioning stage. The frame structure 106 is attached directly to a robot arm 110, without the need for any end of robot arm structures, or stiffening brackets.

Each linear drive mechanism has several mounting surfaces, all of which are capable to interconnect by sets of access and mounting holes, which allow the linear drive mechanism itself to be used as both a structural element, supporting multiple XYZ stages in flat, upright or tilted orientations, as well as to operate as an XYZ positioning system, for positioning process tools. Each XYZ stage may carry a tool, such as a registration pin or a clamp, depending on the specific applications.

FIG. 18 shows another alternative embodiment of a frame structure 106b assembled from only four first-level "base" or "frame" linear drive mechanisms 12a1, 12a2, 12a3 and 12a4. In this embodiment, the bases of four linear drive mechanisms are connected perpendicularly to each other to form a rigid square frame 106b. Specifically, the end cap of each base is connected to one of the outer bottom mounting surfaces of another base so that a rigid square frame 106b is formed. The frame 106b thus formed is directly connected to an end of a robot arm 108.

Further connection of second-level linear drive mechanisms to the frame 106b, and third-level linear drive mechanisms to the second-level linear drive mechanisms, as described above will result in a small universal iEOAT consisting of a base of 4 stages with a total of twelve XYZ stages supporting four tools 104. It can be appreciated that FIG. 18 shows only one of thousands possible configurations with the same twelve stages without the use of any brackets.

Figure 19A:
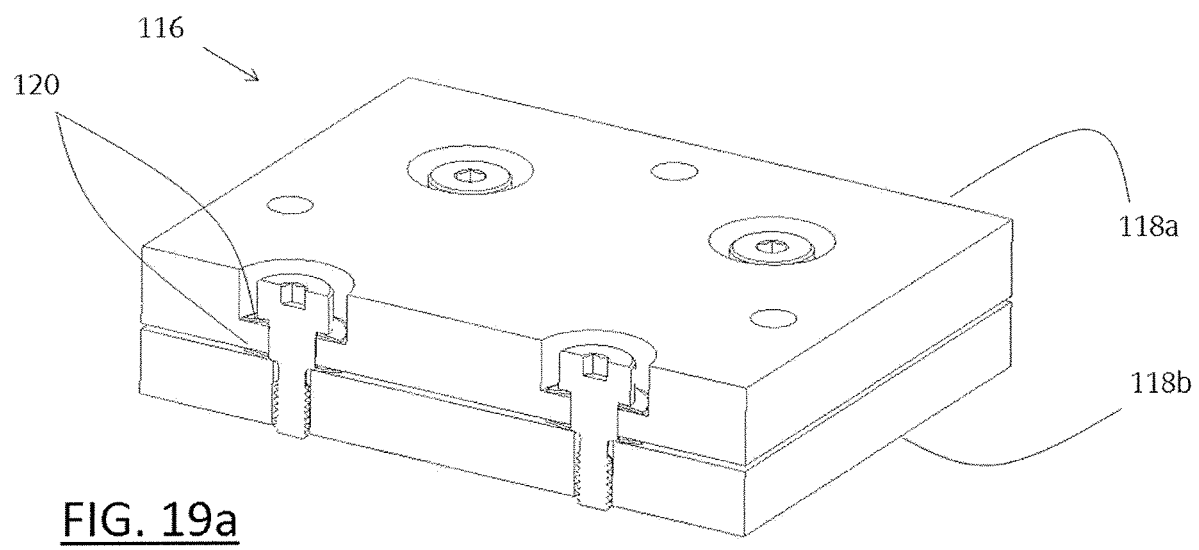
FIGS. 19a and 19b are isolated views of a crash protection device formed in accordance with the present invention.
Figure 19B:
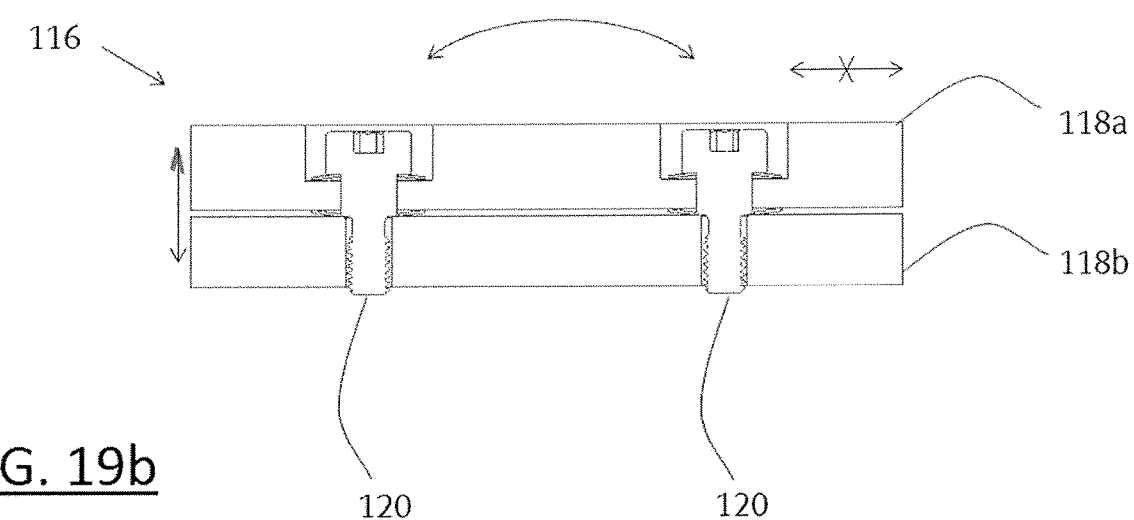

FIG. 18 further shows collision protection devices 116 provided between the base mounting surfaces of connected linear drive mechanisms. As also shown in further detail in FIGS. 19a and 19b, the collision protection device 116 includes two spring preloaded plates 118a, 118b, which can be mounted any where between any two stages in their XYZ configuration and serve to absorb shock by accidental robot collision without damaging the stage.

The plates 118a and 118b are adapted for mounting to a respective mounting surface of a linear drive mechanism. The plates 118a and 118b are also kinematically coupled to one another via flexing elements 120, such as springs, having a sufficient resiliency so as to create compliance for impact absorption and some lateral and angular displacement between the plates.

The crash protection device 116 may be an optional part of the universal iEOAT base frame connecting between some of the base stages (at least one per system), or it may be mounted as part of any XYZ stage at a convenient location. The flexing elements 120 are designed to collapse above the maximum expected process load, but less than the yield point of the stages. A small deflection at the base of the universal iEOAT will allow a much larger deflection at the outer distance, where the accidental crash may most likely hit an exposed stage.

Figure 20:
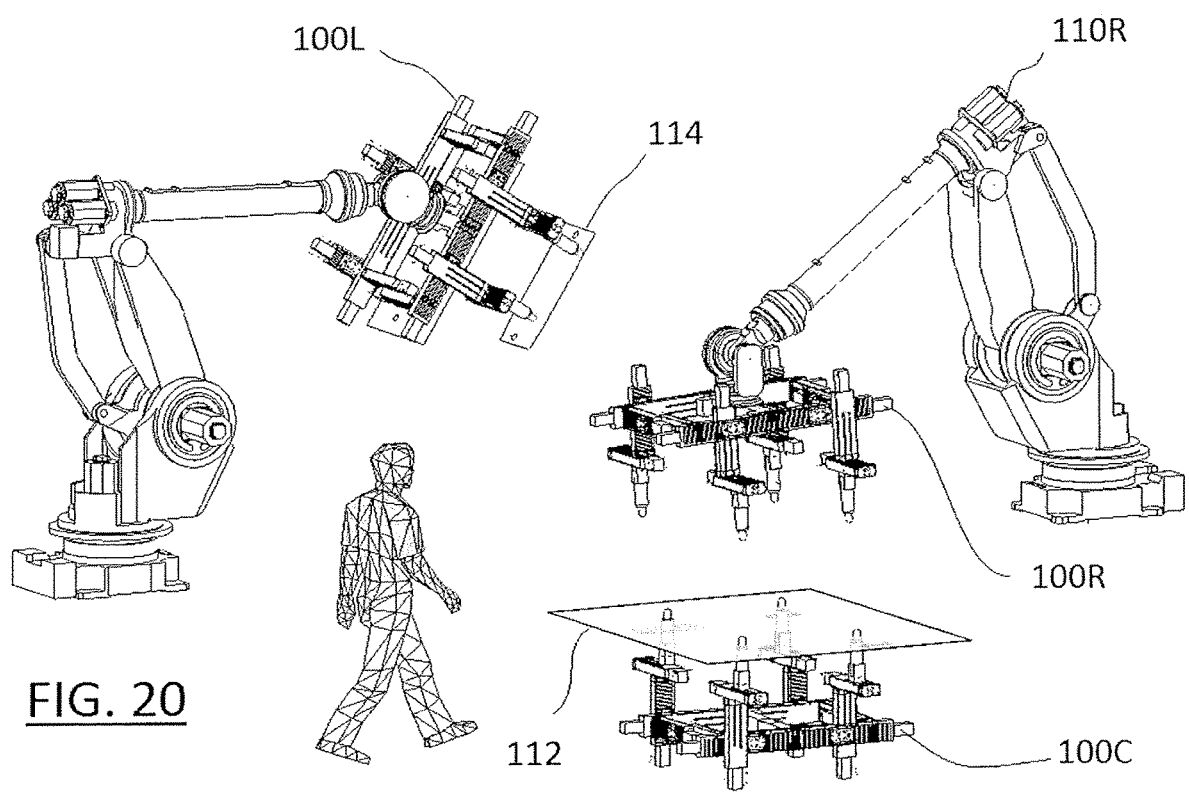
FIG. 20 shows one possible application of two tools formed in accordance with the present invention.

The end of arm robot tool of the present invention can be used in many applications, and can be customized to perform many functions. FIG. 20, for example shows a configuration which uses the same universal iEOAT, both as a part handler 100L (on the left) and a Geo platform 100R (on the right). Each universal iEOATs 100L, 100R are carried by a respective robot 110L, 110R. As shown, the robot on the right 110R picks a main car body part 112 with the universal iEOAT 100R via multiple pins and clamps, and positions the part in a given orientation in space, which was taught to the robot 110L.

The robot 110L on the left picks up, with the same universal iEOAT 100L, two independent stiffening parts 114 to be welded to the main part 112. The robot 110L on the left inserts the two locating holes of the small stiffener part into the two exposed pins on the main part, while the second stiffener is retracted. A welding robot (not shown) then welds the smaller stiffener to the main part. After welding the pins of the smaller part, the pins holding the smaller part retract and the same process repeats for the second stiffener.

After both stiffeners are welded, the main robot 1108 on the right unloads the assembled part and loads a new part 112. The handling robot on the left 110L returns to the loading station and picks up two new parts 114.

The advantages provided by this application include: 1) Eliminates the need for a floor mounted geometric frame therefore saving cost and floor space; 2) The universal iEOAT can handle several parts on one round trip, therefore saving time of the handling robot going back and forth to pick individual parts; 3) Uses the same universal iEOAT for both main part support (acting as the geo frame) and for the part handling, therefore, saving cost of customization of part grippers and geo frames, with one standard iEOAT system; 4) The same robot can change roles servicing different parts on its 4 sides, (e.g., acting as a part handler on the left and as a Geo stand on the right), therefore, giving flexibility of plant automation layout and saving cost of robots and tooling; 5) The two robots can rotate the part 360 degrees and present it to a smaller welding robot and saving the cost of a larger welding robot.

In another aspect of the present invention, a method for assembling multiple linear drive mechanisms to perform a specified function is provided. The method is utilized for constructing a reconfigurable universal multi-axes intelligent end of arm tool (iEOAT), which is particularly adapted for high productivity of automotive manufacturing processes. This method is preferably implemented with an interactive online software program referred to herein as "the softool" and/or "the configurator." Both software programs are intended to assist the process engineer in selecting the optimal configuration for the iEOAT, through a quick interactive process The method for assembling multiple linear drive mechanisms according to the present invention has several objectives. First, the configuration parameters must be defined. This involves defining the desired location of the tools of each work piece, then calculating the required travel in the X, Y, and Z directions for all of the XYZ stages of the present invention. This further involves defining the teach point location of the robot that carries the iEOAT. Once the travel of the XYZ for each tool is determined, it is desired to determine the best configuration for mounting and support surfaces of each stage such that deformations under load are minimized and the precision is maximized.

Figure 21:
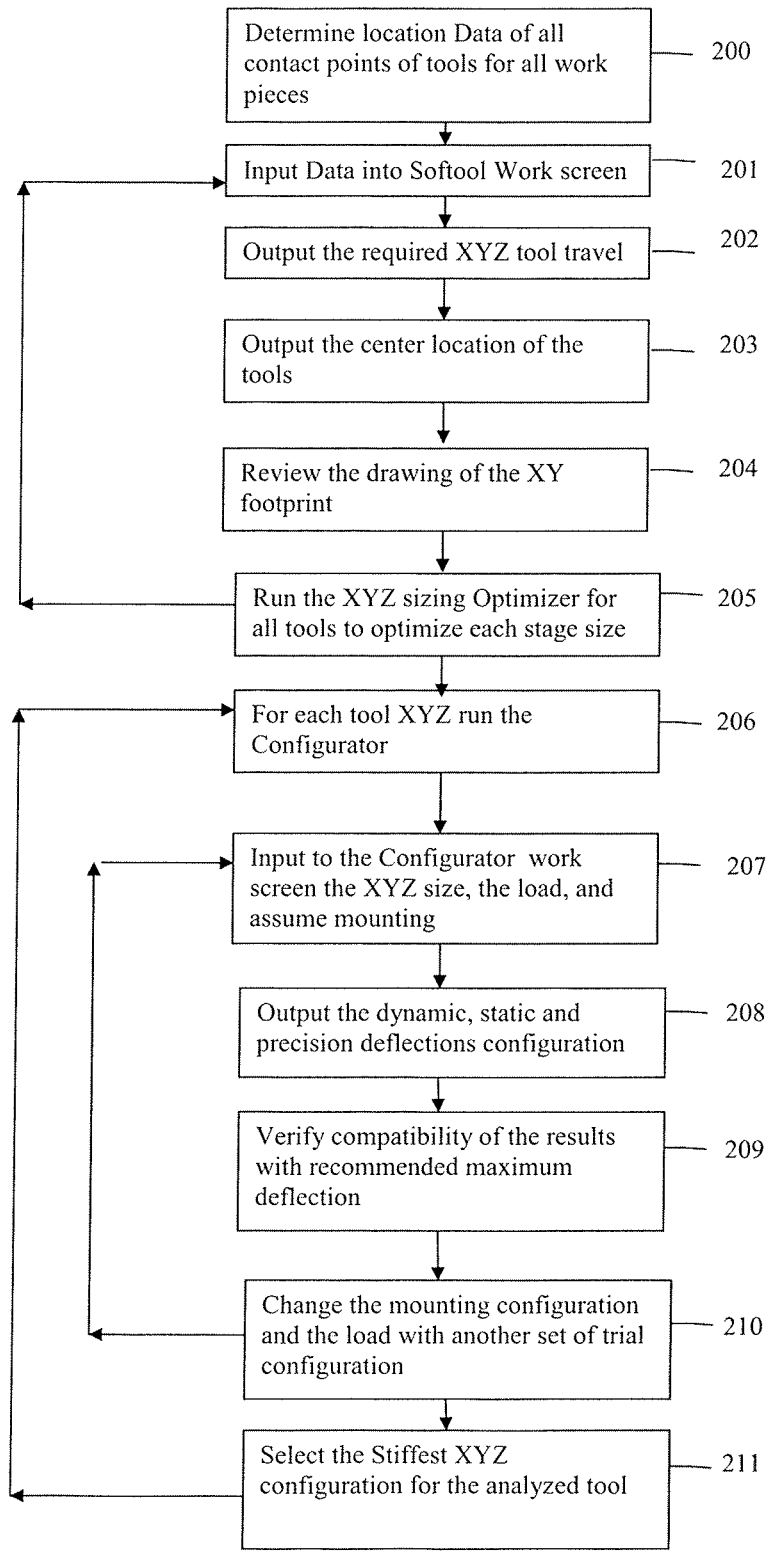
FIG. 21 is a flow chart illustrating a method for configuring an end of robot arm tool in accordance with the present invention.

More specifically, referring to the flow chart shown in FIG. 21, the method according to the present invention generally involves two phases. In the first phase ("softool phase"), the stage travels for each tool (pin or clamp) are selected using an iterative optimization process. In the second phase ("configurator phase"), the selected stage travel of each tool is optimized in an iterative process for their mounting configurations.

The first phase begins with the step 200 of determining locations for all contact points of tools for all of the workpieces to be manipulated by the tool. This information can be provided by a plant engineer as XYZ coordinates referenced to a global coordinate system based on the plant environment. The coordinates include contact points for clamps and/or hole centers for locating pins. These coordinates define the location of the workpiece to be picked-up.

Figure 22A:
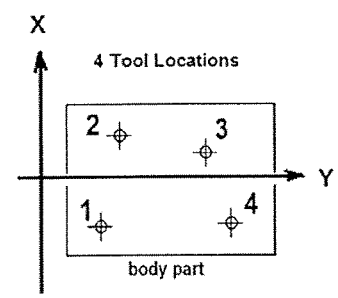
FIG. 22A is a sample computer screen page of an iEOA softool configurator for inputting information and selecting optimal XYZ stage size for each tool (pin or clamp) for use with the method of the present invention.

In step 201, these coordinates are input into fields of a computer work screen, as shown in FIG. 22A. As can be seen in FIG. 22A, a computer software program generates a screen that includes fields that can be populated with the respective global coordinate for each body part model and each tool for each model In step 202, Softool provides an output of the required XYZ travel of each tool in the input. This will typically include the required travel of the tool in the XYZ direction for each workpiece (e.g. body part style). In step 203, the center position of the tool within its travel range and the teach points of the robot end of arm (EOA) interface to the end of arm tool (EOAT), etc. A sample computer screen page for inputting such information is shown in FIG. 22B.

Figure 22C:
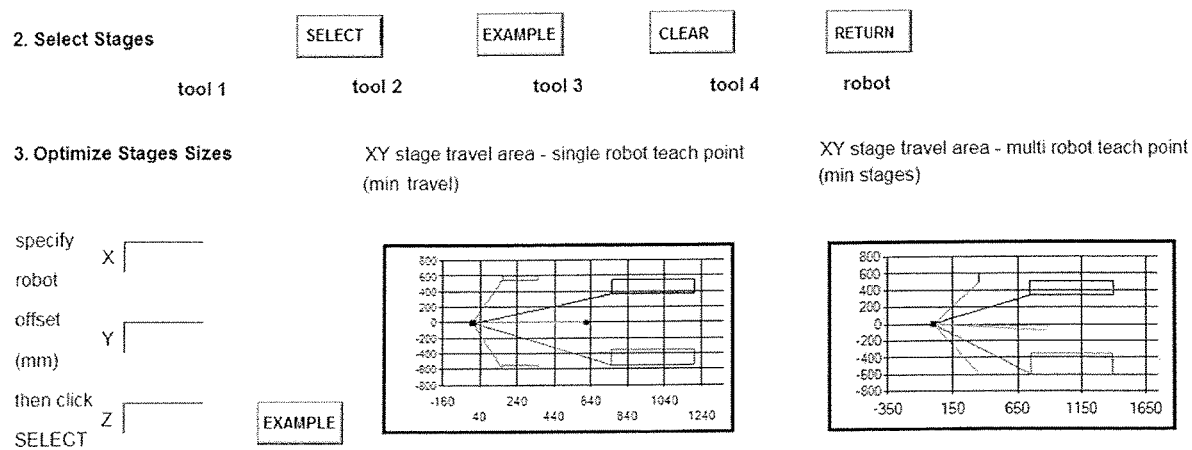

As can be seen in FIG. 22B, a computer software program generates a chart which shows stage travel and location, as well as robot positions for single teach points and multiple teach points. FIG. 22C represents a pictorial view of information in FIG. 20B including a drawing with the XY foot print of each pin, pin center location, and robot teach point for a single teach point and for multiple teach point options. Step 204 of the process involves a review of the drawing and a decision if improvement is required. Such graphical representation can assist the designer to visualize the location and movement for each stage.

If changes in stage sizes are required, an "optimizer" sub-routine is run by the computer software program in step 205. The optimizer sub-routine can offer the designer the option to insert an offset to the robot. Such an offset requires a new teach point, but will make the required travel of some stages less and some stages higher. This feature is helpful in case there is a limitation of available all in one stage travel.

After a choice is made for one tool, a repeat stage selection is done for a new tool with, possibly, a new XYZ stage length.

Phase 2 ("configurator phase") begins with step 206. The output information from the softool then becomes an input to the configurator, which runs at step 206 with the following steps. The XYZ travel of each tool, as found in the Softool, is entered in step 207 to the Configurator work screen, as shown in FIG. 24A. Then, the output of the Configurator, as shown in FIG. 24B, is reviewed in step 208. In step 209, the compatibility of the defection of the stage under load is checked against maximum recommended deflection. In step 210, the mounting configuration may change in an iterative process of searching for the stiffest mounting configuration, which is then selected in step 211. The process then repeats for the XYZ configuration of the next tool, until all configurations are done.

Figure 23:
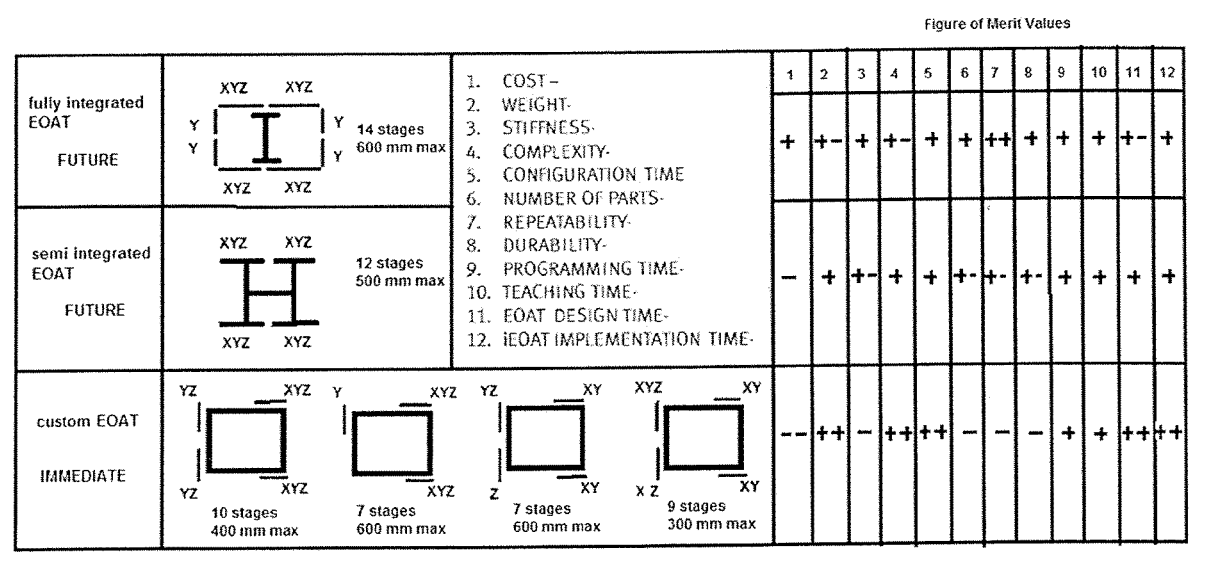

FIG. 23 shows an example of various mounting configurations of 4 tools including a set of metrics that may be used to further rate each configuration with respect to their specific merits. As can be seen in FIG. 23, computer software programmed to carry out the method of the present invention will process the data input to generate visual representations of a number of stage configurations (i.e., numbers and arrangements of linear drive mechanism) that can perform the desired functions. The computer program further weights each possibility based on a number of criteria, which may include cost of the system, weight, stiffness, complexity, configuration time, number of parts, repeatability, durability, programming time, teaching time, EOAT design time, iEoat implementation time. These merits of value can then be displayed in a comparison chart, as shown in FIG. 23.

Thus, the method according to the present invention allows the designer to design a very stiff frame made of interconnected stages. Other stages can be mounted in hundreds of different configurations to best fit the application, all with minimal or no brackets or heavy supporting frames. The software tools provide the designer with a quick way of analyzing the best XYZ stage travel and mounting configuration to result in high stiffness and high precision of the iEOAT tools, such as pins and clamps. In addition, the entire structural frame may be reconfigured to serve a different class of body parts. The entire structure is extremely stiff since it employs several stages in carrying the process loads in different directions. Therefore, weak spots of the small stage, such as roll stiffness, are not being expressed when working in parallel with other stages, which resist the load in direction of higher stiffness.

The entire structure is light-weight, which is ideal for robot handling since only the stages participate in the structure without any additional mounting frames or stiffening brackets.

While various embodiments of the present invention are specifically illustrated and/or described herein, it will be appreciated that modifications and variations of the present invention may be effected by those skilled in the art without departing from the spirit and intended scope of the invention.

What is claimed is:

1. A non-transitory computer storage medium encoded with a computer program, the program comprising instructions that when executed by data processing apparatus cause the data processing apparatus to perform operations comprising:
   determining at least one possible configuration of a plurality of linear drive mechanisms to form an end of arm tool for a robot, wherein each linear drive mechanism comprises a base, a slide linearly traversable with respect to the base, and a plurality of mounting surfaces, wherein the determination is based on the input of global coordinates of a plurality of pick-up locations of a work piece to be manipulated by the tool and the input of a required output of the tool based on a desired path of travel of the workpiece.

2. The non-transitory computer storage medium as defined in claim 1, wherein the program comprises further instructions that when executed by data processing apparatus cause the data processing apparatus to display a graphical representation of the at least one possible configuration of a plurality of linear drive mechanisms arranged to perform the required output of the tool.

3. The non-transitory computer storage medium as defined in claim 1, wherein the program comprises further instructions that when executed by data processing apparatus cause the data processing apparatus to optimize the at least one possible configuration of a plurality of linear drive mechanisms by determining the optimum mounting surfaces for directly connecting one linear drive mechanism to another.

4. The non-transitory computer storage medium as defined in claim 3, wherein the optimization is an iterative process.

5. The non-transitory computer storage medium as defined in claim 1, wherein a plurality of possible configurations of a plurality of linear drive mechanisms is determined, and wherein the program comprises further instructions that when executed by data processing apparatus cause the data processing apparatus to calculate and display a merit value for each possible configuration representing at least one of a cost, weight, stiffness, complexity, configuration time, number of parts, reportability, drivability, programming time, teaching time, design time and implementation time.

* * * * *